US 12,545,520 B2

(12) United States Patent
Imakiire et al.

(10) Patent No.: US 12,545,520 B2
(45) Date of Patent: Feb. 10, 2026

(54) LINEAR TRANSPORT APPARATUS

(71) Applicant: KYOTO SEISAKUSHO CO., LTD., Kyoto (JP)

(72) Inventors: Ryutaro Imakiire, Kyoto (JP); Toshiyuki Onishi, Kyoto (JP)

(73) Assignee: Kyoto Seisakusho Co., Ltd., Kyoto (JP)

( * ) Notice: Subject to any disclaimer, the term of this patent is extended or adjusted under 35 U.S.C. 154(b) by 71 days.

(21) Appl. No.: 18/726,160

(22) PCT Filed: Jan. 11, 2023

(86) PCT No.: PCT/JP2023/000438
§ 371 (c)(1),
(2) Date: Jul. 2, 2024

(87) PCT Pub. No.: WO2023/136261
PCT Pub. Date: Jul. 20, 2023

(65) Prior Publication Data
US 2025/0100806 A1    Mar. 27, 2025

(30) Foreign Application Priority Data

Jan. 11, 2022  (JP) .................................. 2022-002233

(51) Int. Cl.
*B65G 17/12*    (2006.01)
*B65G 47/86*    (2006.01)
*B65G 54/02*    (2006.01)

(52) U.S. Cl.
CPC ........... *B65G 17/12* (2013.01); *B65G 47/847* (2013.01); *B65G 54/02* (2013.01); *B65G 47/842* (2013.01)

(58) Field of Classification Search
CPC ...... B65G 17/12; B65G 54/02; B65G 47/842; B65G 47/847

(Continued)

(56) References Cited

U.S. PATENT DOCUMENTS 4,172,514 A * 10/1979 Shantz .................. B23P 19/008
                                                                198/470.1
5,101,954 A *  4/1992 Nambu ................ B65G 17/323
                                                                209/912

(Continued)

FOREIGN PATENT DOCUMENTS

CN      113454009 A  *  9/2021  ............... B67C 3/24
DE     10119275 A1  * 10/2002  ........... B65G 17/323

(Continued)

OTHER PUBLICATIONS

International Search Report (with partial translation) dated Mar. 28, 2023, issued in corresponding International Patent Application No. PCT/JP2023/000438.

*Primary Examiner* — James R Bidwell
(74) *Attorney, Agent, or Firm* — Morgan, Lewis & Bockius LLP

(57) ABSTRACT

A linear transport apparatus has a first carriage 1 and a second carriage 2 movably disposed on a guide member 3 and support portions 13 and 23 supporting a bottom portion 53 of a box member 500. A first claw portion 12 provided on the first carriage 1 has an inner contact portion 121 making contact with the inner face of the box member and a rear contact portion 122 making contact with the rear face of the box member. A second claw portion 22 provided on the second carriage 2 has an inclined face 221 extending rearward as it goes away from the guide member 3 and making contact with a corner part between the front and outer faces of the box member. The support portions 13 and 23 are disposed on at least one of the first and second carriages 1 and 2.

8 Claims, 16 Drawing Sheets

(58) Field of Classification Search
USPC .............................................. 198/803.3, 805
See application file for complete search history.

(56) References Cited

U.S. PATENT DOCUMENTS

| | | | | |
|---|---|---|---|---|
| 5,630,311 A | * | 5/1997 | Flix | B65G 47/842 |
| | | | | 198/459.8 |
| 2015/0136564 A1 | | 5/2015 | Hurni et al. | |
| 2016/0107844 A1 | * | 4/2016 | Lelie | B65G 54/02 |
| | | | | 198/494 |
| 2019/0084210 A1 | * | 3/2019 | Mellen | B29C 49/42075 |

FOREIGN PATENT DOCUMENTS

| | | | |
|---|---|---|---|
| JP | 2015-525176 A | 9/2015 | |
| WO | WO-2020126424 A1 * | 6/2020 | ........... B65G 47/244 |
| WO | WO-2021200561 A1 * | 10/2021 | ............. B65G 54/02 |

* cited by examiner

LINEAR TRANSPORT APPARATUS

TECHNICAL FIELD

The present invention relates to a linear transport apparatus employing a linear motor.

BACKGROUND ART

JP-T-2015-525176 discloses, as an apparatus for transporting articles, a linear transport apparatus that employs a linear motor. This linear transport apparatus includes a stator of the linear motor, in which an electric magnet is disposed, and a transport member, in which a permanent magnet is disposed. The electric magnet and the permanent magnet constitute a linear motor system. The transport member has a holder or handling holder so that holding a product with holders or handling holders lined up along the transport direction and moving the transport member achieves the transport of the product.

CITATION LIST

Patent Literature

Patent Document 1: JP-T-2015-525176

SUMMARY OF INVENTION

Technical Problem

The linear transport apparatus of Patent Document 1 requires a holder that suits the size and shape of the product transported. This results in diminished versatility of the linear transport apparatus.

Under the above background, an object of the present invention is to provide a linear transport apparatus that can transport articles of varying sizes and shapes with a universal carriage.

Solution to Problem

To achieve the above object, according to one aspect of the present invention, a linear transport apparatus holds a box member in a rectangular shape as seen in a plan view and transports the box member along a previously set transport direction. The linear transport apparatus includes: a guide portion formed in the shape of a loop as seen in a plan view: a first carriage and a second carriage that are disposed on the guide portion next to each other along the transport direction and that are movable along the transport direction: a linear driving unit that controls the first and second carriages independently; and a support portion that supports a bottom portion of the box member. The second carriage is disposed frontward of the first carriage along the transport direction. The first carriage has a first claw portion protruding away from the guide portion. The second carriage has a second claw portion protruding away from the guide portion. The first claw portion has: an inner contact portion that has a first contact face extending along the transport direction and making contact with the inner face of the box member along the transport direction; and a rear contact portion that has a second contact face making contact with the rear face of the box member along the transport direction. The second claw portion has, in at least part of its rear face along the transport direction, an inclined face extending rearward along the transport direction as it goes away from the guide portion and making contact with a coupling part between the front face of the box member along the transport direction and the outer face of the box member. The support portion is disposed on at least one of the first and second carriages.

Advantageous Effects of Invention

With a linear transport apparatus according to the present invention, it is possible to transport articles of varying sizes and shapes with a universal carriage.

DESCRIPTION OF EMBODIMENTS

Embodiments of the present invention will be described below with reference to the accompanying drawings.

<Linear Transport Apparatus 100>

Figure 1:
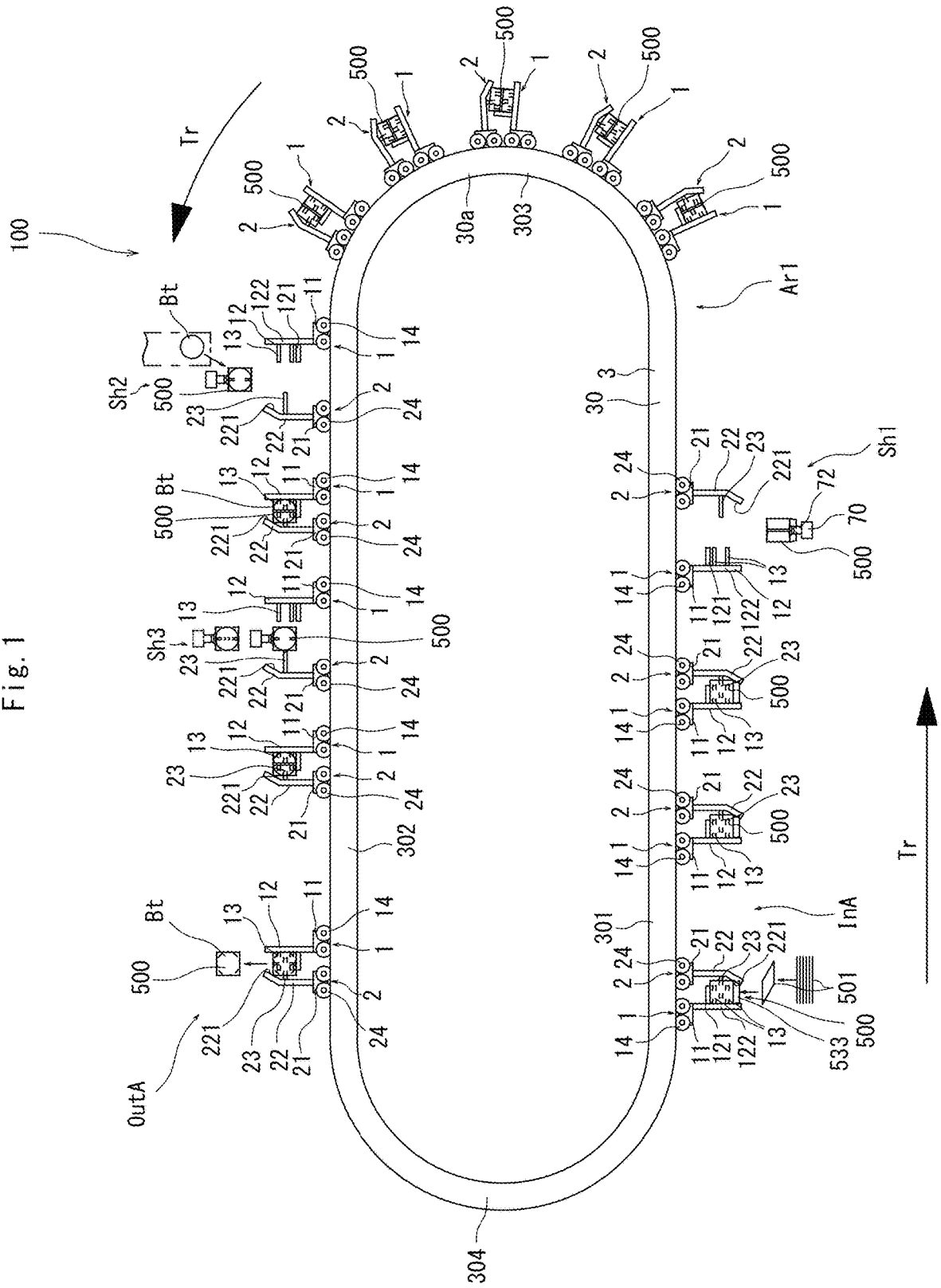
FIG. 1 is a schematic layout diagram of a linear transport apparatus according to the present invention.
Figure 2:
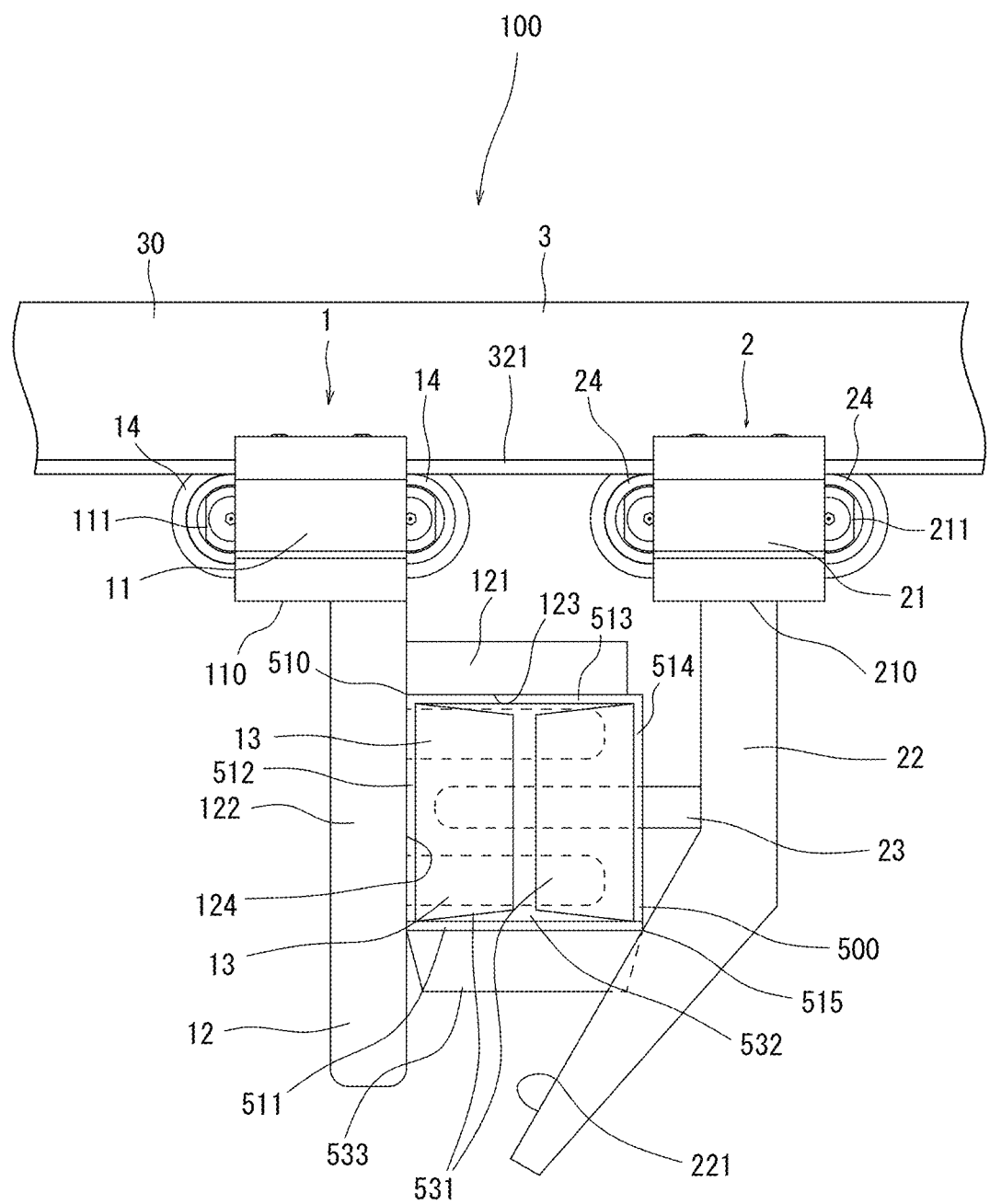
FIG. 2 is a plan view of a first carriage and a second carriage holding a box member moving along a straight guide rail.
Figure 3:
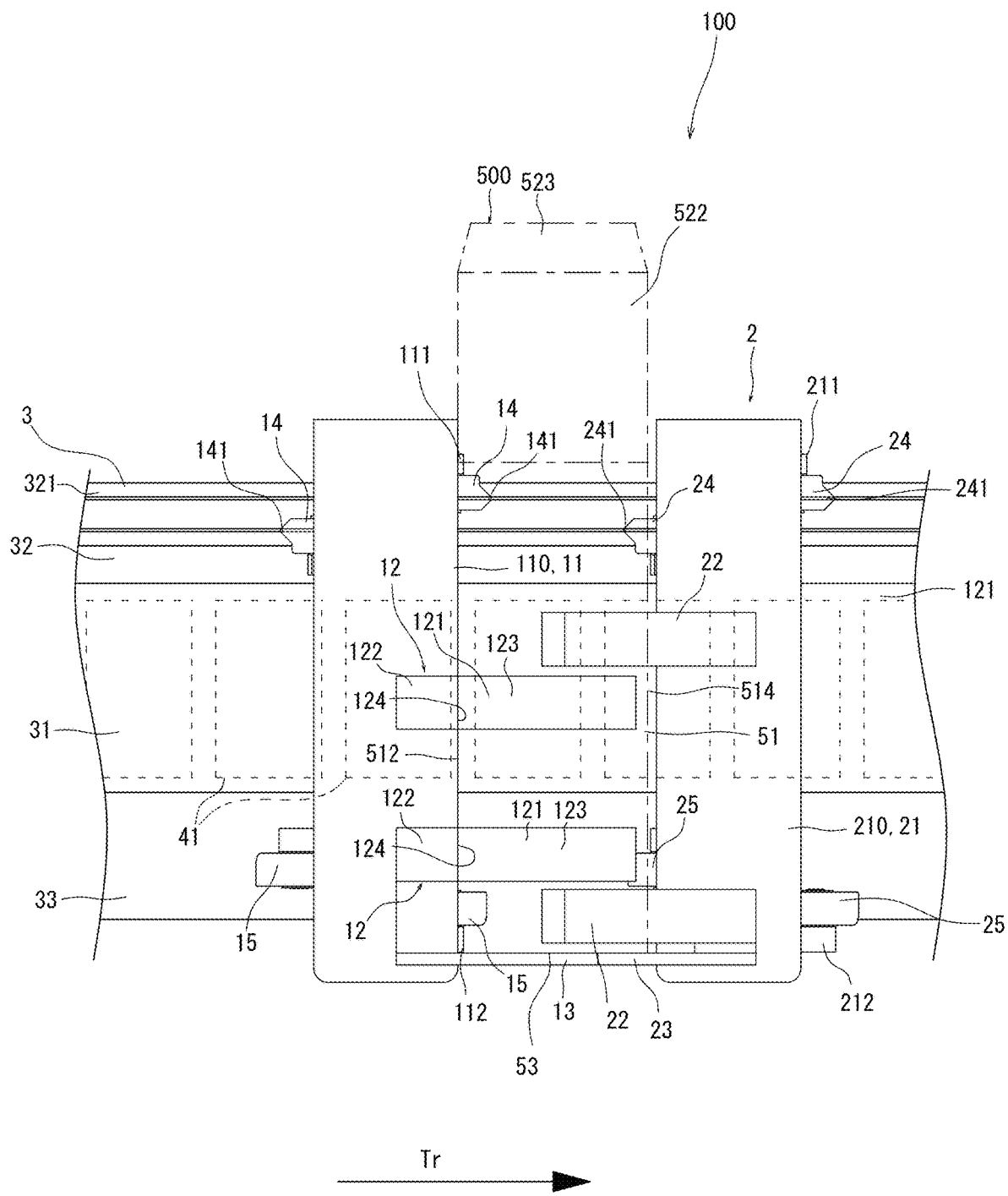
FIG. 3 is a diagram showing the first and second carriages shown in FIG. 2 as seen from outward.
Figure 4:
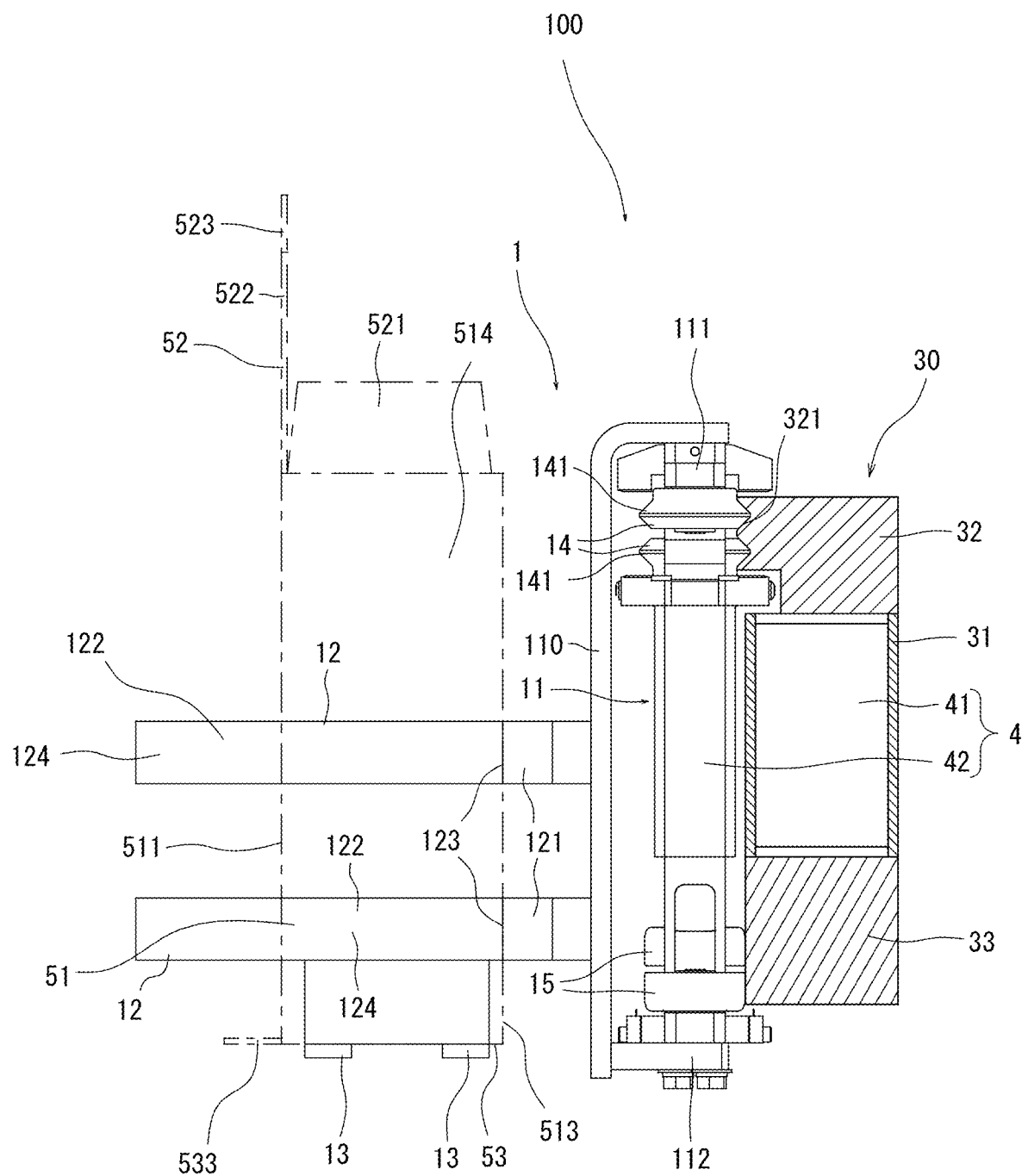
FIG. 4 is a diagram showing the first carriage as seen from in front along the transport direction.
Figure 5:
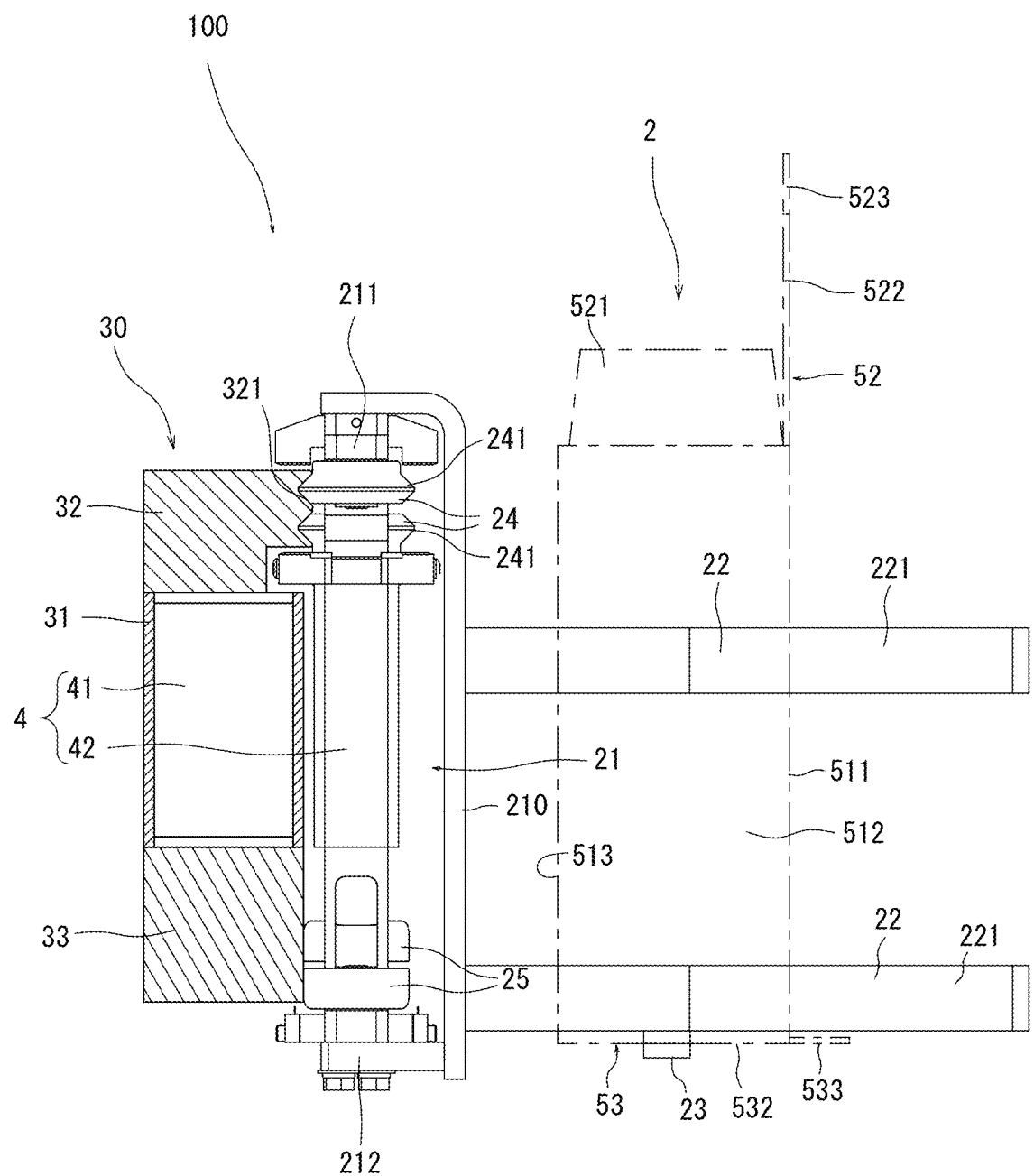
FIG. 5 is a diagram showing the second carriage as seen from behind along the transport direction.

FIG. 1 is a schematic layout diagram of a linear transport apparatus 100 according to the present invention. FIG. 2 is a plan view of a first carriage 1 and a second carriage 2 holding a box member 500 moving along a linear guide rail 30. FIG. 3 is a diagram showing the first and second carriages 1 and 2 shown in FIG. 2 as seen from outward. FIG. 4 is a diagram showing the first carriage 1 as seen from in font along the transport direction. FIG. 5 is a diagram showing the second carriage 2 as seen from behind along the transport direction. In FIGS. 2 and 3, the box member 500 is indicated by dash-and-dot lines.

As shown in FIG. 1, the linear transport apparatus 100 is formed in the shape of a loop resulting from coupling together the opposite ends of a guide portion 3. In the following description, with respect to the loop-form guide portion 3, the direction facing into the area surrounded by the guide portion 3 is often expressed as "inward" and the direction facing away from that area is often expressed as "outward".

As shown in FIG. 1, the linear transport apparatus 100 is incorporated in a manufacturing process for an unillustrated product to transport box members 500 as articles-to-be-transported by use of a linear motor.

The linear transport apparatus 100 receives a box member 500 at a carry-in section InA. The box member 500 has the shape of a square rectangular parallelepiped and has a lid portion 52 and a bottom portion 53. The article-to-be transported may have any shape other that of the box member 500. The article-to-be transported may have, for example, a rectangular shape as seen in a plan view. The box member 500 keeps its square shape as seen in a plan view by being held along a diagonal direction with a first claw portion 12 and a second claw portion 22. The holding of the box member 500 will be described in detail later.

The linear transport apparatus 100 transports the box member 500 up to a carry-out section OutA. In the linear transport apparatus 100 shown in FIG. 1, the transport direction is the counter-clockwise direction and the region from the carry-in section InA to the carry-out section OutA is a transport region Ar1. Near the transport region Ar1 are disposed a first processing section Sh1, a second processing section Sh2, and a third processing section Sh3. The layout of the linear transport apparatus 100 may be modified as desired in accordance with the arrangement of the carry-in section InA, the carry-out section OutA, the first processing section Sh1, the second processing section Sh2, and the third processing section Sh3. While the linear transport apparatus 100 of this embodiment has three processing sections near the transport region Ar1, this is not meant as any limitation. There may be provided two or less processing sections, or four or more processing sections.

In the linear transport apparatus 100, the first carriage 1 and the second carriage 2, which will be described later, hold the box member 500. The first and second carriages 1 and 2 move in coordination to transport the box member 500. As shown in FIGS. 1 to 4, the linear transport apparatus 100 has a first carriage 1, a second carriage 2, a guide portion 3, and a linear driving unit 4.

<Guide Portion 3>

The guide portion 3 guides the movement of the first and second carriages 1 and 2. The guide portion 3 has a guide rail 30. As shown in FIGS. 3 to 5 etc., the guide rail 30 has a main rail 31, a grooved rail 32, and a flat rail 33.

The main rail 31 is a tubular member with a rectangular cross-sectional shape on a plane orthogonal to the transport direction Tr. The cross-sectional shape of the main rail 31 has its longer-side direction along the top-bottom direction. Inside the main rail 31 is disposed a coil 41 of the linear driving unit 4. The main rail 31 is formed of a material that transmits the magnetic force from the coil 41 when this is excited by being fed with electric current. Examples of such materials include some types of stainless steel, aluminum, and alloys of any of those, with no limitation intended.

The grooved rail 32 is fastened to the top of the first carriage 1. The fastening between the main rail 31 and the grooved rail 32 can be achieved by welding, screw fastening, or the like, with no limitation intended. The main rail 31 and the grooved rail 32 may be formed unitarily. The grooved rail 32 has a rail portion 321 in a recessed shape recessed from the outer face of the grooved rail 32 along a direction intersecting with the transport direction Tr. The rail portion 321 is formed around the entire circumference of the guide portion 3. The grooved rail 32 has two rail portions 321. The two rail portion 321 are disposed one above the other. The two rail portions 321 have fitted in them a roller ridge 141 of an upper roller 14, described later, of the first carriage 1 and a roller ridge 241 of an upper roller 24, described later, of the second carriage 2. The upper and lower rollers 14 and 24 move along the rail portions 321.

The flat rail 33 is fastened to the bottom of the main rail 31. The fastening between the main rail 31 and the flat rail 33 can be achieved by welding, screw fastening, or the like, with no limitation intended. The main rail 31 and the flat rail 33 may be formed unitarily. The flat rail 33 is so shaped that the outer side of its cross section across a plane intersecting with the transport direction Tr aligns with a vertical straight line (see FIG. 4 etc.). The outer face of the flat rail 33 is contacted by a lower roller 15, described later, of the first carriage 1 and a lower roller 25, described later, of the second carriage 2. The lower rollers 15 and 25 rotate while in contact with the outer face of the flat rail 33.

The guide portion 3 is formed in the shape of a loop resulting from coupling together the opposite ends of a guide rail 30. The guide portion 3 includes a first straight portion 301, a second straight portion 302, a first curved portion 303, and a second curved portion 304 (see FIG. 1), together constituting the guide rail 30.

The first and second straight portions 301 and 302 are each formed with a straight guide rail 30. The first and second straight portions 301 and 302 has equal lengths and are disposed parallel to each other as seen in a plan view. The first and second straight portions 301 and 302 are both disposed with the rail portions 321 of the grooved rail 32 facing outward.

The first curved portion 303 includes a curved guide rail 30a. The first curved portion 303 may be partly straight. The front end of the first straight portion 301 along the transport direction Tr and the rear end of the second straight portion 302 along the transport direction Tr are connected together. The second straight portion 302 connects together the front end of the second straight portion 302 along the transport direction and the rear end of the first straight portion 301 along the transport direction. Thus, the guide portion 3 is formed in the shape of a loop as a result of the first straight portion 301, the first curved portion 303, the second straight portion 302, and the second curved portion 304 being coupled together in this order.

In the guide portion 3 used in the linear transport apparatus 100 of this embodiment, the first and second curved portions 303 and 304 are in the shape of an arc with the same radius of curvature, with not limitation intended. The first and second curved portions 303 and 304 may be formed in the shape of a curve such as a cycloid curve or a trochoid curve.

In the linear transport apparatus 100, the guide portion 3 is put together in the shape of a loop. The first and second carriages 1 and 2 are disposed outward of the guide portion 3 and move along the guide portion 3. Thus, the first and second carriages 1 and 2 circulate along the guide portion 3.

In the linear transport apparatus 100, the transport region Ar1 is a region along the first straight portion 301, the first curved portion 303, and the second straight portion 302 of the guide portion 3. That is, the carry-in section InA, where a box member 500 is carried in, is disposed in a rear-end part of the first straight portion 301 along the transport direction Tr. Near the straight portion 301, the first processing section Sh1 is disposed. The second and third processing sections Sh2 and Sh3 are disposed near the second straight portion 302.

In the linear transport apparatus 100, the box member 500 carried in at the carry-in section InA is held by the first and second carriages 1 and 2 in the carry-in section InA and is transported across the transport region Ar1. During its transport, it is processed at each of the first, second, and third processing sections Sh1, Sh2, and Sh3. The box member 500 held by the first and second carriages 1 and 2 is carried out of the linear transport apparatus 100 at the carry-out section OutA. The carry-in section InA, the first, second, and third processing sections Sh1, Sh2, and Sh3, and the carry-out section OutA will be described in detail later.

Next, the individual parts of the linear transport apparatus 100 will be described in detail. First, the first and second carriages 1 and 2 will be described.

<First Carriage 1>

The first carriage 1 is disposed on the outer face of the guide rail 30 and is movable along the guide portion 3. As shown in FIGS. 2 to 4, the first carriage 1 has a first body portion 11, a first claw portion 12, a first support portion 13, an upper roller 14, and a lower roller 15.

In the first body portion 11, a magnet 42, described later, of the linear driving unit 4 is disposed. The first body portion 11 is disposed outward of the guide rail 30, so as to face it. In the first carriage 1 used in the linear transport apparatus 100 of this embodiment, the magnet 42 is housed inside the first body portion 11 and faces a coil 41 disposed in the main rail 31 along a direction intersecting with the transport direction. On the outer side of the first body portion 11, a mounting plate 110 is disposed. The first claw portion 12 and the first support portion 13 are fitted to the mounting plate 110.

The first claw portion 12 has an inner contact portion 121 and a rear contact portion 122. The inner contact portion 121 has a first contact face 123. The first contact face 123 is a face orthogonal to both the transport direction and the top-bottom direction. The first contact face 123 makes contact with an inner face (third side face portion 513), described later, of the box member 500 and holds the third side face portion 513. Accordingly, the first contact face 123 can be a vertical face, with no limitation intended.

So long as, when the box member 500 is held by the first and second carriages 1 and 2, the inner face of the box member 500 can be held securely, any structure can be employed. While this embodiment deals with a structure where the box member 500 is held with the third side face portion 513 as the inner face, this is not meant as any limitation. The first claw portion 12 is formed of, for example, resin to reduce its weight. This is not meant as any limitation and the first claw portion 12 may be formed of metal. In that case, to make the first claw portion 12 as light as possible and to avoid an adverse effect on linear driving, it is preferable to use a non-magnetic metal.

The rear contact portion 122 has a second contact face 124. The second contact face 124 is a face orthogonal to the transport direction, and is formed to face forward along the transport direction. The second contact face 124 makes contact with a rear face (second side face portion 512), described later, of the box member 500 along the transport direction and holds the second side face portion 512. Accordingly, second contact face 124 can be a vertical face, with no limitation intended. So long as, when the box member 500 is held by the first and second carriages 1 and 2, the rear face of the box member 500 is held securely, any structure can be employed.

The box member 500 has the second and third side face portions 512 and 513 held by the first claw portion 12. That is, the box member 500 is held such that a coupling part 510 between the second and third side face portions 512 and 513 serves as a reference point.

The horizontal cross-sectional shape of the box member 500 is rectangular (square). Accordingly, the first and second contact faces 123 and 124, which respectively make contact with two meeting faces of the box member 500, are orthogonal to each other. This however is not meant as any limitation: the first and second contact faces 123 and 124 may be disposed to form an angle corresponding to the horizontal cross-sectional shape of the box member 500. With any structure, for easy transport and processing of the box member 500, it is preferable that the first contact face 123 extend along the transport direction Tr.

As shown in FIGS. 3 and 4, the first carriage 1 has two first claw portions 12 disposed one above the other. The first contact face 123 of each of the upper and lower first claw portions 12 makes contact with the third side face portion 513, i.e., the inner face, of the box member 500. The second contact face 124 of each of the upper and lower second claw portions 22 makes contact with the second side face portion 512, i.e., the rear face, of the box member 500. Thus, the upper and lower first contact faces 123 are disposed on the same plane: the upper and lower second contact faces 124 are disposed on the same plane. With this structure, the upper and lower first claw portions 12 hold the box member 500 securely.

Here, at least one of the first and second contact faces 123 and 124 may be given the shape of a curved surface that bulges outward at the middle so as to make line contact with the box member 500. Also with this structure, contact at two, upper and lower, places achieves stable holding of the box member 500.

The first support portion 13 is in the shape of an elongate plate extending along the transport direction Tr; two first support portions 13 are disposed on the first carriage 1. The top face of the first support portion 13 is flat, and supports a bottom portion of the box member 500. The first support portion 13 is disposed below the second contact face 124 of the lower first claw portion 12, and extends frontward along the transport direction Tr; that is, it is disposed below the lower first claw portion 12, and extends in the direction orthogonal to the direction in which the first claw portion 12 extends. The first support portions 13 are disposed at an interval from each other in the direction orthogonal to the transport direction Tr.

The first carriage 1 has two upper rollers 14. The two upper rollers 14 are rotatably supported on an upper roller support portion 111 disposed in an upper part of the first body portion 11. Specifically, the upper roller 14 is rotatably disposed on a rotation shaft that is orthogonal to the transport direction Tr and parallel to the outer face of the guide rail 30. The two upper rollers 14 are disposed away from each other along the transport direction, at different positions along the top-bottom direction. In the first carriage 1 of this embodiment, the upper roller 14 (see FIG. 3) frontward along the transport direction is disposed below.

The outer circumferential face of the upper roller 14 has a roller ridge 141 that protrudes radially outward from edge to center along the axial direction, The roller ridge 141 fits in the rail portion 321 of the grooved rail 32. The upper roller 14 rotates in a state fitted in the rail portion 321. Thus, when the first carriage 1 moves along the guide rail 30, the first carriage 1 is prevented from being displaced along the top-bottom direction: that is, the first carriage 1 moves accurately along the guide portion 3.

The first carriage 1 has two lower rollers 15. The two lower rollers 15 are rotatably supported on a lower roller support portion 112 disposed in a lower part of the first body portion 11. Specifically, the lower roller 15 is rotatably disposed on a rotation shaft that is orthogonal to the transport direction Tr and parallel to the outer face of the guide rail 30. The lower roller 15 is in a cylindrical shape. The outer circumferential face of the lower roller 15 makes contact with the outer face of the flat rail 33. The two lower rollers 15 are disposed away from each other along the transport direction Tr, at different positions along the top-bottom direction. In the first carriage 1 of this embodiment, the lower roller 15 (see FIG. 15) frontward along the transport direction is disposed above.

The first carriage 1 is, under the magnetic force of the magnet 42 disposed inside it, attracted to the outer face of the guide rail 30. The guide rail 30 may be provided with an attracting portion formed of a metal, such as iron, that attracts a magnet, or attraction may be achieved between an iron core provided in the coil 41 and the magnetic force of the magnet 42. The first carriage 1 is movable along the guide rail 30 and can be fitted to the guide rail 30 with a hook or the like such that it does not easily drop off the guide rail 30.

When the first carriage 1 is fitted on the outer face of the guide rail 30, the upper and lower rollers 14 and 15 make contact with the guide rail 30, so that the first body portion 11 is disposed at a predetermined interval from the outer face of the guide rail 30. As the first carriage 1 moves along the guide rail 30, the upper and lower rollers 14 and 15 rotate while in contact with the guide rail 30. That is, the first carriage 1 is, at its top and bottom, supported by the upper and lower rollers 14 and 15. Thus, the first carriage 1 moves along the guide rail 30 while keeping a predetermined angle relative to the guide rail 30.

The upper and lower rollers 14 and 15 of the first carriage 1 are disposed symmetrically about the middle line with respect to the top-bottom direction. Thus, when the first carriage 1 moves along the guide rail 30, the first carriage 1 is unlikely to be acted on by a force pointing upward or downward. This too helps achieve stable movement of the first carriage 1 along the guide rail.

<Second Carriage 2>

The second carriage 2 is arranged on the outer face of the guide rail 30 and is movable along the guide portion 3. As shown in FIGS. 2, 3, and 5, the second carriage 2 has a second body portion 21, a second claw portion 22, a second support portion 23, an upper roller 24, and a lower roller 25.

In the second body portion 21, a magnet 42, described later, of the linear driving unit 4 is disposed. The second body portion 21 is disposed outward of the guide rail 30, so as to face the guide rail 30. In the second carriage 2 used in the linear transport apparatus 100 of this embodiment, the magnet 42 is housed inside the second body portion 21 and faces the coil 41 disposed in the main rail 31 along a direction intersecting with the transport direction. On the outer side of the second body portion 21, a mounting plate 210 is disposed. The second claw portion 22 and the second support portion 23 are fitted to the mounting plate 210.

The second claw portion 22 protrudes outward from the second body portion 21. When the second carriage 2 is fitted to the guide rail 30, the second claw portion 22 forms a predetermined angle relative to the transport direction Tr. The second claw portion 22 is formed of, for example, resin to reduce its weight. This is not meant as any limitation and the second claw portion 22 may be formed of metal. In that case, to make the second claw portion 22 as light as possible and to avoid an adverse effect on linear driving, it is preferable to use a non-magnetic metal.

As shown in FIGS. 3 and 5, the second claw portion 22 has an inclined face 221 that faces rearward along the transport direction Tr. The inclined face 221 extends rearward along the transport direction Tr as it goes outward. In other words, the inclined face 221 extends rearward along the transport direction Tr as it goes away from the guide portion 3.

The second carriage 2 is disposed frontward of the first carriage 1 along the transport direction Tr. Thus, the second claw portion 22 of the second carriage 2 and the first claw portion 12 of the first carriage 1 line up along the transport direction Tr. The inclined face 221 makes contact with a coupling portion 515 between the front face (fourth side face 514) of the box member 500 along the transport direction Tr and the outer face (first side face 511) of the box member 500.

The second support portion 23 is in the shape of an elongate plate extending along the transport direction Tr, and one second support portion 23 is disposed on the second carriage 2. The top face of the second support portion 23 is flat and supports a bottom portion 53 of the box member 500. The second support portion 23 is disposed below the lower second claw portion 22 and extends rearward along the transport direction Tr. That is, the second support portion 23 extends in the direction orthogonal to the direction in which the second claw portion 22 extends from the second body portion 21. When the box member 500 is held by the first and second carriages 1 and 2, the second support portion 23 is disposed so as to be located in the gap between the first support portions 13 that are disposed to line up.

The second carriage 2 has two upper rollers 24. The two upper rollers 24 are rotatably supported on an upper roller support portion 211 of the second body portion 21. Specifically, the upper roller 24 is rotatably disposed on a rotation shaft that is orthogonal to the transport direction Tr and parallel to the outer face of the guide rail 30. The two upper rollers 24 are disposed away from each other along the transport direction, at different positions along the top-bottom direction. In the second carriage 2 of this embodiment, the upper roller 24 (see FIG. 2) frontward along the transport direction is disposed below.

The outer circumferential face of the upper roller 24 has a roller ridge 241 that protrudes radially outward from edge to middle along the axial direction. The roller ridge 241 fits in the rail portion 321 of the grooved rail 32.

The upper roller 24 rotates in a state fitted in the rail portion 321. Thus, when the second carriage 2 moves along the guide rail 30, the second carriage 2 is prevented from being displaced along the top-bottom direction. That is, the second carriage 2 moves accurately along the guide portion 3.

The second carriage 2 has two lower rollers 25. The two lower rollers 25 are rotatably supported on a lower roller support portion 212 of the second body portion 21. Specifically, the lower roller 25 is rotatably disposed on a rotation shaft that is orthogonal to the transport direction Tr and parallel to the outer face of the guide rail 30. The lower roller 25 is in a cylindrical shape. The outer circumferential face of the lower roller 25 makes contact with the outer face of the flat rail 33. The two lower rollers 25 are disposed away from each other along the transport direction, at different positions along the top-bottom direction. In the second carriage 2 of this embodiment, the lower roller 25 (see FIG. 3) frontward along the transport direction is disposed above.

The second carriage 2 is, under the magnetic force of the magnet 42 disposed inside it, attracted to the outer face of the guide rail 30. The guide portion 30 may be provided with an attracting portion formed of a metal, such as iron, that attracts a magnet, or attraction may be achieved between an iron core provided in the coil 41 and the magnetic force of the magnet 42. The second carriage 2 is movable along the guide rail 30 and can be fitted to the guide rail 30 with a hook or the like such that it does not easily drop off the guide rail 30.

When the second carriage 2 is attracted to the outer face of the guide rail 30, the upper and lower rollers 24 and 25 make contact with the guide rail 30, so that the second body portion 21 is disposed at a predetermined interval from the outer face of the guide rail 30. When the second carriage 2 moves along the guide rail 30, the upper and lower rollers 24 and 25 rotate while in contact with the guide rail 30. That is, the second carriage 2 is, at its top and bottom, supported by the upper and lower rollers 24 and 25. Thus, the second carriage 2 moves along the guide rail 30 while keeping a predetermined angle relative to the guide rail 30.

The upper and lower rollers 24 and 25 of the second carriage 2 are disposed symmetrically about the middle line with respect to the top-bottom direction. Thus, when the second carriage 2 moves along the guide rail 30, the second carriage 2 is unlikely to be acted on by a force pointing upward or downward. This too helps achieve stable movement of the second carriage 2 along the guide rail 30.

As described above, the two upper rollers 14 of the first carriage 1 and the two upper rollers 24 of the second carriage 2 both have the ones frontward along the transport direction Tr disposed below. On the other hand, the two lower rollers 15 of the first carriage 1 and the two lower rollers 25 of the 2 both have the ones frontward along the transport direction Tr disposed above. This prevents, when the second carriage 2 comes close to the first carriage 1 at its rear side along the transport direction Tr, contact between the upper rollers 14 and 24 and between the lower rollers 15 and 25.

With no box member 500 held between them, the first and second carriages 1 and 2 are located at a short distance from each other. This helps reduce the region in which to keep on standby the first and second carriages 1 and 2 with no box member 500 held between them. It is thus possible to reduce the installation area of the linear transport apparatus 100.

<Linear Driving Unit 4>

Figure 6:
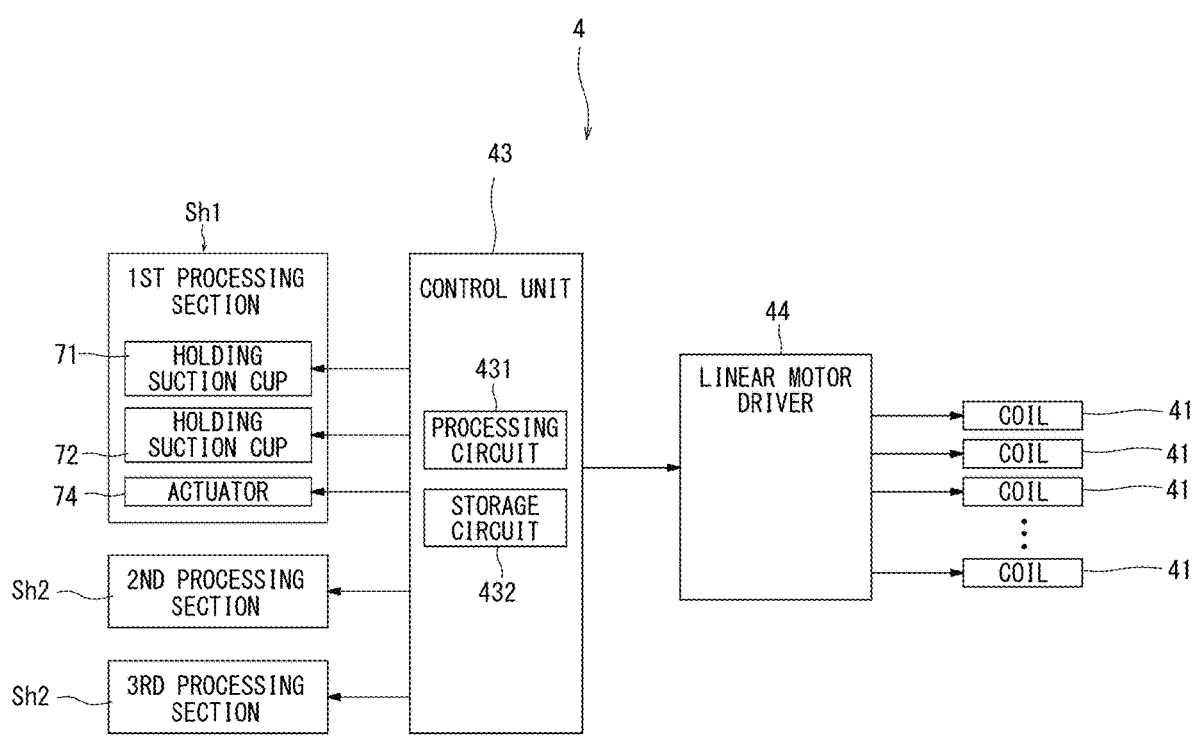
FIG. 6 is a functional block diagram of a linear driving unit.

The linear driving unit 4 will be described with reference to the relevant drawings. FIG. 6 is a functional block diagram of the linear driving unit 4. The linear driving unit 4 employs a linear motor mechanism. The linear driving unit 4 can drive the first and second carriages 1 and 2 independently.

As shown in FIGS. 3 to 6 etc., the linear driving unit 4 has a plurality of coils 41, a magnet 42, a control unit 43 (see FIG. 6), and a linear motor driver 44 (see FIG. 6). Inside the guide rail 30, which is disposed in the shape of a loop, the plurality of coils 41 are disposed along the loop. The plurality of coils 41 can be supplied with electric power independently of each other (see FIG. 6).

The magnet 42 is a permanent magnet and is disposed in the first body portion 11 of the first carriage 1. As shown in FIGS. 4 and 5, the magnet 42 is disposed inside the first body portion 11. The first body portion 11 is formed of a material that a magnet does not attract. Thus, the magnetic force of the magnet 42 leaks out of the first body portion 11. The magnet 42 is disposed such that it and the coil 41 can apply magnetic forces to each other. The magnet 42 disposed in the first body portion 11 of the first carriage 1 and the plurality of coils 41 disposed inside the guide rail 30 constitute a linear motor. Further, the magnet 42 disposed in the second body portion 21 of the second carriage 2 and the plurality of coils 41 disposed inside the guide rail 30 also constitute the linear motor.

The control unit 43 controls the operation of different parts of the linear driving unit 4. As shown in FIG. 6, the control unit 43 has a processing circuit 431 and a storage circuit 432. The processing circuit 431 is a circuit that processes various kinds of information and includes an arithmetic circuit such as a CPU or an MPU. The processing circuit 431 also controls the driving of the above-mentioned linear motor based on the results of the processing.

The storage circuit 432 is a circuit that includes, or has connected to it, semiconductor memories such as a ROM and a RAM, a portable memory such as a flash memory, and a storage medium such as a hard disc. The linear motor can be controlled by the processing circuit 431 running a program corresponding to the desired processing out of programs stored in the storage circuit 432.

The control unit 43 performs control to change the operating states of the first and second carriages 1 and 2, for example, the speeds of the first and second carriages 1 and 2. The control unit 43 has the linear motor driver 44 connected to it. The linear motor driver 44 is connected to an unillustrated power supply circuit. The linear motor driver 44 is a circuit that controls the electric power supplied to the coil 41, and includes circuits such as an arithmetic processing circuit and a power supply circuit that adjusts the voltage and the electric current fed to the individual coils 41. Based on instructions from the control unit 43, the linear motor driver 44 supplies the individual coils 41 with appropriate electric current.

When the coil 41 is supplied with electric current, the coil 41 is excited. Between the excited coil 41 and the magnet 42 disposed in the first body portion 11 of the first carriage 1, a magnetic force is produced. As the coils 41 to which the electric current is supplied are switched sequentially, under the attracting and repelling magnetic forces between the coils 41 and the magnet 42, the first carriage 1 moves along the guide portion 3. Also, between the coil 41 and the magnet 42 disposed in the second body portion 21 of the second carriage 2, a magnetic force is produced. As the coils 41 to which the electric current is supplied are switched sequentially, under the attracting and repelling magnetic forces between the coils 41 and the magnet 42, the second carriage 2 moves along the guide portion 3. The control unit 43 can control the movement of the first and second carriages 1 and 2 independently.

<Box Member 500>

Figure 7:
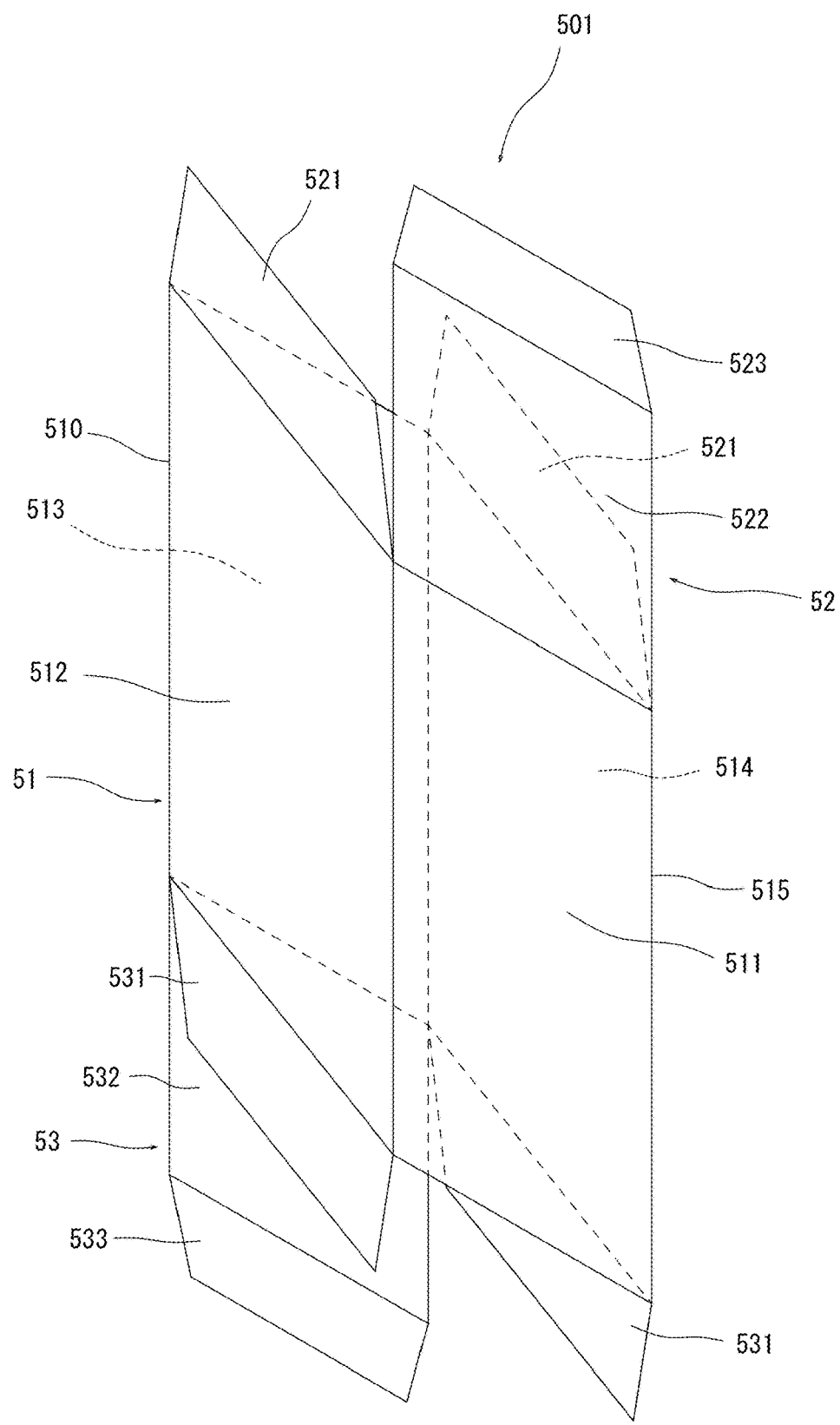
FIG. 7 is a perspective view of a folded member before being formed into a box member.
Figure 8:
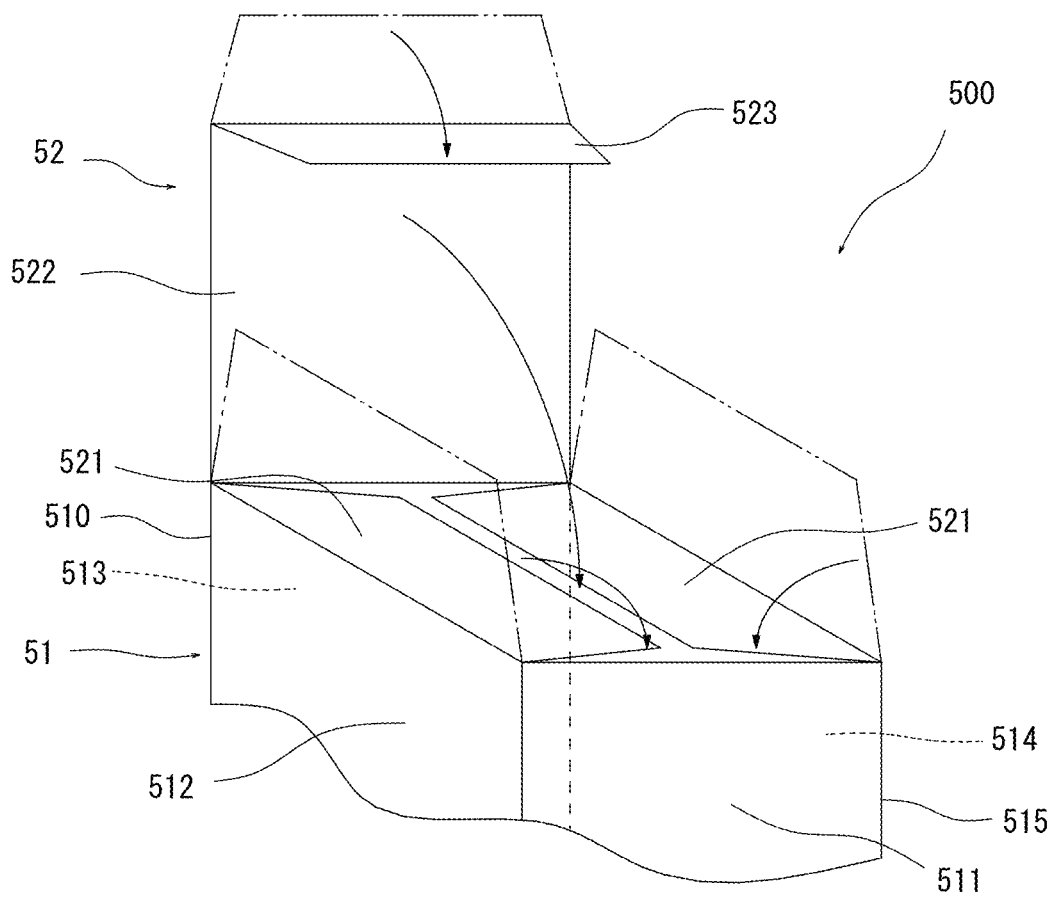
FIG. 8 is a perspective view showing the formation of a lid portion.
Figure 9:
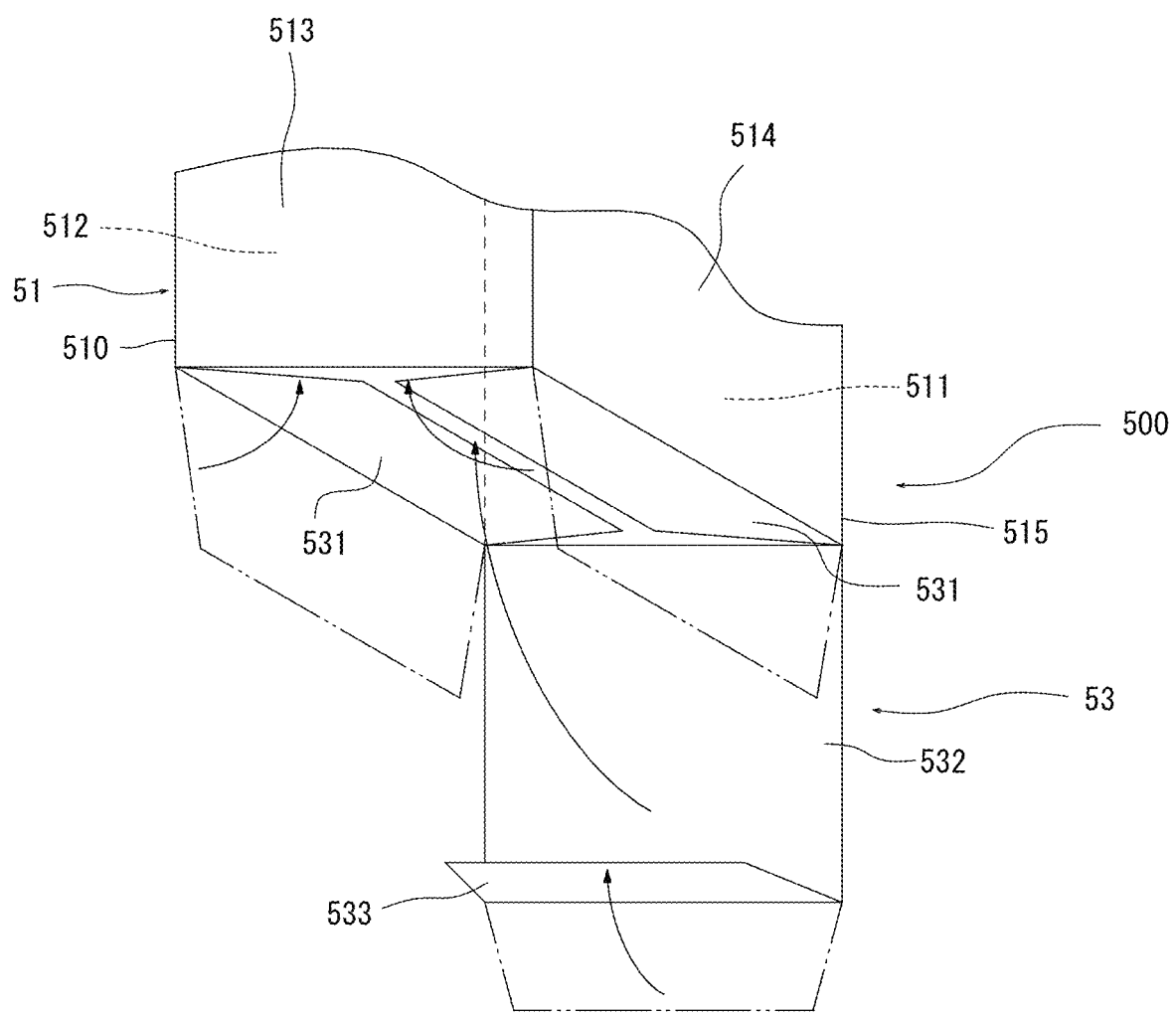
FIG. 9 is a perspective view showing the formation of a bottom portion as seen from below.

Next, the box member 500 as an article-to-be transported will be described with reference to the relevant drawings. FIG. 7 is a perspective view of a folded member 501 before it is formed into the box member 500. FIG. 8 is a perspective view showing the formation of a lid portion 52. FIG. 9 is a perspective view, as seen from below, showing the formation of a bottom portion 53. As shown in FIG. 7, the box member 500 has a tubular portion 51, a lid portion 52, and a bottom portion 53. The box member 500 is made of, for example, paper. The material for the box member 500, however, is not limited to paper and any material that can be folded so as to be formed into the box member 500 can be used.

As shown in FIGS. 7 to 9, the tubular portion 51 has a first side face portion 511, a second side face portion 512, a third side face portion 513, and a fourth side face portion 514. The first, second, third, and fourth side face portions 511, 512, 513, and 514 are, for example, in the shape of rectangles that are substantially congruent. The first, second, third, and fourth side face portions 511, 512, 513, and 514 are disposed in this order and form a tubular shape when the first and fourth side face portions are bonded together. In this case, the tubular portion 51 has a substantially square horizontal cross section.

As shown in FIGS. 7 and 8, the lid portion 52 has a pair of inner lid plates 521, an outer lid plate 522, and an upper insertion flap portion 523. The pair of inner lid plates 521 are coupled to the top ends of the second and fourth side face portions 512 and 514 respectively. The pair of inner lid plates 521 are folded inward relative to the second and fourth side face portions 512 and 514 respectively and covers a wide area over the top end of the tubular portion 51. Here, "covering a wide area over" should be understood to mean "covering completely" as well as "covering partly such that the uncovered part is far smaller (e.g., several percent or less) than the covered part".

The outer lid plate 522 is coupled to the top end of the first side face portion 511. The outer lid plate 522 has a square shape congruent with the horizontal cross section of the tubular portion 51. The outer lid plate 522 is folded relative to the first side face portion 511 to be disposed outside the pair of inner lid plates 521. Thus, the top end of the tubular portion 51 is closed. To the side of the outer lid plate 522 opposite from its side coupled to the first side face portion 511, the upper insertion flap portion 523 is coupled. The upper insertion flap portion 523 is folded relative to the outer lid plate 522 and is inserted in the gap between the pair of inner lid plates 521 and the third side face portion 513. Thus, the lid portion 52 is closed.

As shown in FIGS. 7 and 9, the bottom portion 53 has a pair of inner bottom plates 531, a bottom lid portion 532, and a bottom insertion flap portion 533. The pair of inner bottom plates 531 are coupled to the bottom ends of the second and fourth side face portions 512 and 514 respectively. The pair of inner bottom plates 531 are folded inward relative to the second and fourth side face portions 512 and 514 respectively to cover a wide area over the bottom end of the tubular portion 51.

The bottom lid portion 532 is coupled to the bottom end of the third side face portion 513. The bottom lid portion 532 has a square shape congruent with the horizontal cross section of the tubular portion 51. The bottom lid portion 532 is folded relative to the third side face portion 513 and is disposed outside the pair of inner bottom plates 531. Thus, the bottom end of the tubular portion 51 is closed. To the side of the bottom lid portion 532 opposite from its side coupled to the third side face portion 513, the bottom insertion flap portion 533 is coupled. The bottom insertion flap portion 533 is folded relative to the bottom lid portion 532 and is inserted in the gap between the pair of inner bottom plates 531 and the first side face portion 511. Thus, the bottom portion 53 is closed.

The folded member 501 is formed in the shape of a flat plate as a result of its being folded at a coupling portion between the second and third side face portions 512 and 513 and a coupling portion between the first and fourth side face portions 511 and 514. Unfolding those side face portions results in forming the tubular portion 51. Specifically, taking the first and fourth side face portions 511 and 514 apart form each other and taking the second and third side face portions 512 and 513 apart from each other results in forming the tubular portion 51. In the following description, forming the tubular portion 51 is expressed as expanding the tubular portion 51.

The box member 500 may have any structure other than as specifically described above. For example, the bottom portion 53 may be of what is called a one-touch type that has a pair of bottom plate portions each coupled to contiguous side face portions and in the shape of a folded triangle. With a box member 500 of the one-touch type, when the folded member 501 is formed into the box member 500, as the side face portions are moved, the bottom plate portions are unfolded until the bottom plate portions engage with each other to form the bottom portion. This helps eliminate the step of forming the bottom portion 53.

<Holding and Transport of the Box Member 500>

As shown in FIG. 2, in the linear transport apparatus 100, the box member 500 is carried in at the carry-in section InA. The box member 500 is then, in a state held by the first and second carriages 1 and 2, transported along the guide portion 3. That is, the box member 500 is transferred to the linear transport apparatus 100 at the carry-in section InA.

In the carry-in section InA, a plurality of folded members 501 are disposed. In the carry-in section InA, a folded member 501 is expanded so that a box member 500 with the bottom portion 53 in a preliminarily folded state will be transferred to the linear transport apparatus 100.

In the carry-in section InA, first, the first and fourth side face portions 511 and 514 are taken apart from each other and the second and third side face portions 512 and 513 are taken apart from each other. This operation of taking side face portions apart from each other can be achieved, for example, by sucking the side face portions with unillustrated suction cups, with no limitation intended. The operation of taking side face portions apart may be achieved by applying inward forces to the coupling portion between the first and fourth side face portions 511 and 514 and the coupling portion between the second and third side face portions 512 and 513. So long as the four side face portions that will be formed into the tubular portion 51 can be expanded accurately, any method can be employed.

In the preliminary folding of the bottom portion 53, the pair of inner bottom plates 531 are folded to be inside the tubular portion 51 and the bottom lid portion 532 is folded to cover the outer sides of the inner bottom plates 531. Here, the bottom insertion flap portion 533 remains unfolded. In the carry-in section InA, the box member 500 with the bottom portion 53 in a preliminarily folded state is placed on the first and second support portions 13 and 23.

As shown in FIGS. 1 to 3, the box member 500 is, in a state held by the first and second carriages 1 and 2, transported along the guide portion 3. In the linear transport apparatus 100, at the carry-in section InA, the box member 500 is held by the first and second carriages 1 and 2 such that the fourth side face portion 514 is the front face along the transport direction Tr and that the second side face portion 512 is the rear face along the transport direction Tr.

More specifically, of the first claw portion 12 of the first carriage 1, the first contact face 123 of the inner contact portion 121 makes contact with the third side face portion 513 and the second contact face 124 of the rear contact portion 122 makes contact with the second side face portion 512. Moreover, the inclined face 221 of the second claw portion 22 of the second carriage 2 makes contact with the coupling portion 515 between the first and fourth side face portions 511 and 514 of the box member 500. That is, the box member 500 held by the first and second carriages 1 and 2 is pressed inward along a diagonal line so as to expand the tubular portion 51. Thus, it is held such that the horizontal cross section of the tubular portion 51 is substantially square.

Owing to the first claw portions 12 being disposed one above the other and the second claw portions 22 being disposed one above the other, the tubular portion 51 of the box member 500 has a square shape that is uniform over its entire length along the top-bottom direction.

As shown in FIG. 3, the inclined face 221 of the second claw portion 22 presses inward along a diagonal direction the coupling portion 515 between the first and fourth side face portions 511 and 514. Thus, the box member 500 is pressed by the inclined face 221 not only rearward along the transport direction Tr but also inward. This restricts, when the first and second carriages 1 and 2 move, outward movement of the box member 500.

Figure 10:
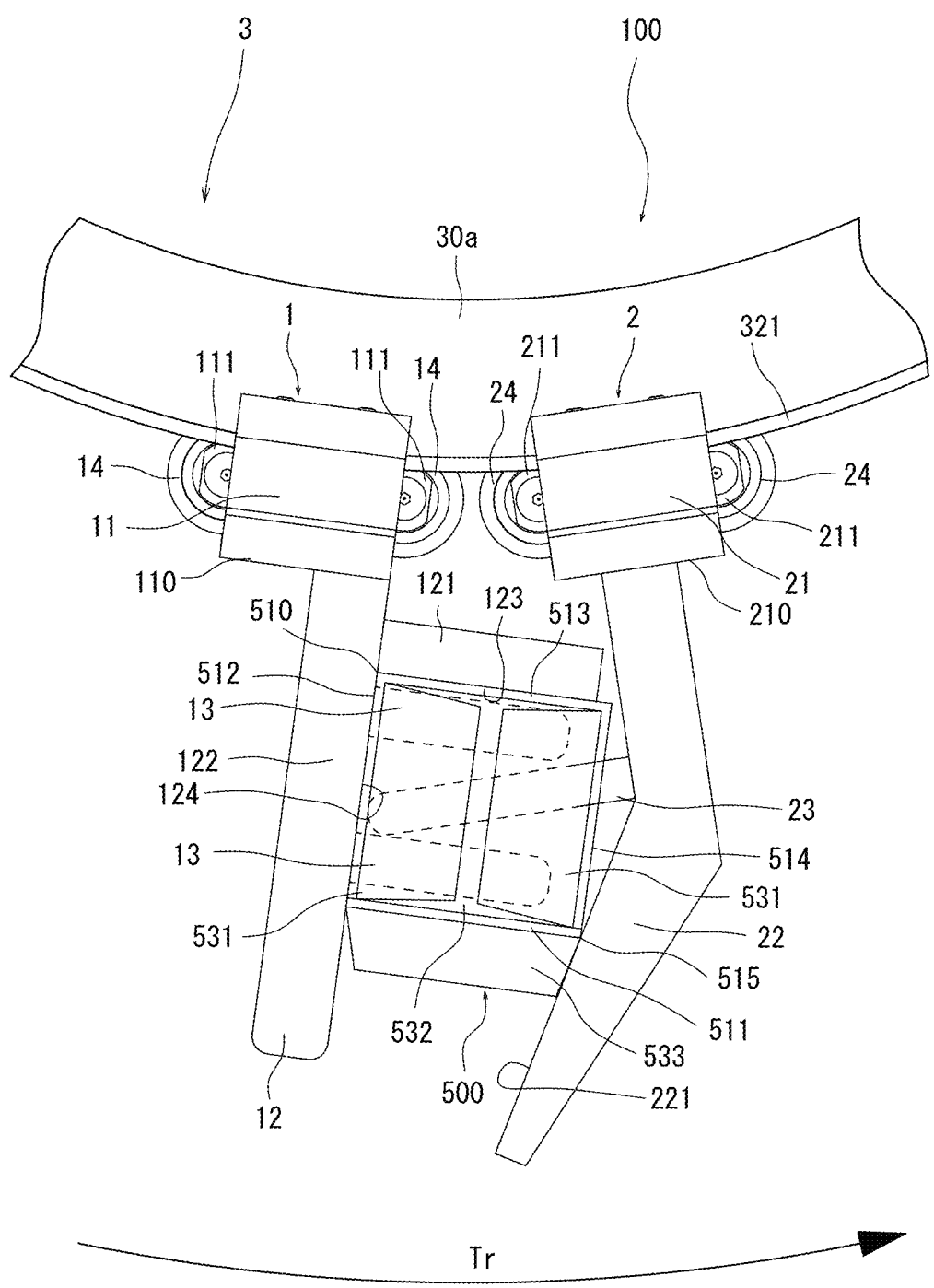
FIG. 10 is a plan view showing the first and second carriages holding a box member moving along a curved guide rail.

Next, the movement of the first and second carriages 1 and 2 holding the box member 500 along a curved portion will be described. FIG. 10 is a plan view of the first and second carriages 1 and 2 holding the box member 500 moving along the curved guide rail 30a.

As described above, the angle of the first claw portion 12 of the first carriage 1 relative to the transport direction Tr is fixed. Accordingly, the angle of the box member 500 relative to the first body portion 11 of the first carriage 1 remains constant. When the first and second carriages 1 and 2 move along the curved guide rail 30a, the angle of the second carriage 2 relative to the first carriage 1 is different from when they move along the straight guide rail 30. More specifically, the angle of the second claw portion 22 relative to the first claw portion 12 of the first carriage 1 is, in movement along the curved guide rail 30a, larger than in movement along the straight guide rail 30.

The inclined face 221 of the second claw portion 22 makes contact with a corner part of the box member 500 at the coupling portion 515, which is in the shape of a line extending in an extension direction. Thus, even when as the angle of the first carriage 1 relative to the second carriage 2 changes the angle of the first claw portion 12 relative to the second claw portion 22 changes, the inclined face 221 remains in contact with the box member 500 at the coupling portion 515. Here, the inclined face 221 presses the box member 500 inward in a direction along a diagonal line. Thus, even when the angle between the first and second carriages 1 and 2 changes, the first and second claw portions 12 and 22 can hold the tubular portion 51 of the box member 500.

The first and second support portions 13 and 23 are disposed at an interval from each other along the direction orthogonal to the transport direction Tr. The first support portion 13 extends frontward along the transport direction Tr, in the direction orthogonal to the first claw 12. The second support portion 23 extends rearward along the transport direction Tr, in the direction orthogonal to the second claw portion 22. That is, when the first and second carriages 1 and 2 are moving along the straight guide rail 30, the first and second support portions 13 and 23, which are disposed substantially parallel to each other, are disposed to form a predetermined angle.

Owing to the first and second support portions 13 and 23 being disposed at an interval from each other, when the first and second carriages 1 and 2 move along the curved guide rail 30a, the first and second support portions 13 and 23 do not interfere with each other. The width of the interval between the first and second support portions 13 and 23 can be determined appropriately based on the lengths of the first and second support portions 13 and 23 in the longitudinal direction and the curvature of the curved guide rail 30a.

As described above, in the linear transport apparatus 100 of this embodiment, the first and second carriages 1 and 2 can securely hold the box member 500 irrespective of whether it is moving along the straight guide rail 30 or along the curved guide rail 30a. In the linear transport apparatus 100 of this embodiment, the box member 500 is held by being pressed by the first claw 12 of the first carriage 1 and the second claw portion 22 of the second carriage 2 pressing it along a diagonal line. Thus, the box members 500 of varying sizes can be held with no change in the shapes of the first and second claw portions 12 and 22.

Figure 11:
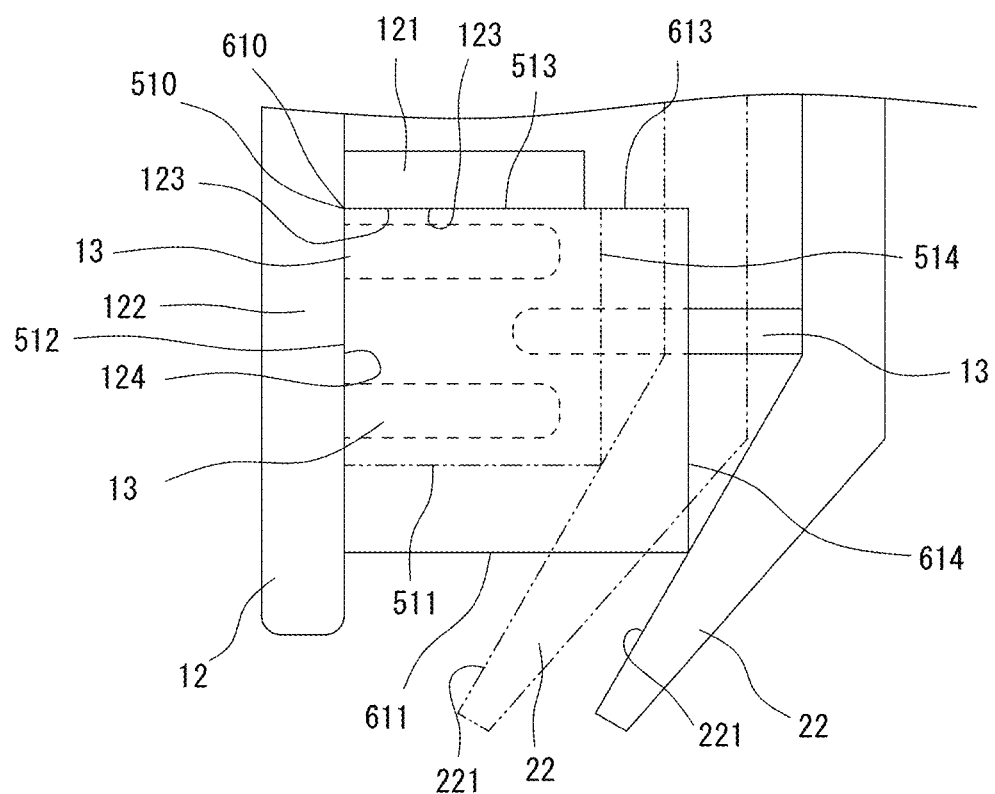
FIG. 11 is a plan view showing a large box member being held.

Next, how a box member 600 larger than the box member 500 as seen in a plan view is held will be described with reference to the relevant drawings. FIG. 11 is a plan view showing how a large box member 600 is held. In FIG. 11, only the first claw 12 of the first carriage 1 and the second claw portion 22 of the second carriage 2 are shown, with their respective body portions, upper rollers, and lower rollers omitted from illustration. For comparison, the box member 500 is indicated by dash-and-dot lines.

As shown in FIG. 11, the inner contact portion 121 and the rear contact portion 122 of the first claw 12 hold a third side face portion 613 and a second side face portion 612 of the box member 600. That is, irrespective of the size of the box member, the first claw 12 holds the coupling portion (610) between the rear face (second side face portion 612) of the box member along the transport direction Tr and the inner face (third side face portion 613) of the box member. That is, when the first and second carriages 1 and 2 hold a box member, the reference point remains the same irrespective of the size of the box member.

On the other hand, the inclined face 221 of the second claw portion 22 of the second carriage 2 makes contact with the corner opposite from the coupling portion held by the first claw 12 of the first carriage 1, and this permits the box member to be held. The box member 600 larger than the box member 500 as seen in a plan view has a longer diagonal length. Thus, the second carriage 2 is disposed farther away from the first carriage 1 so as to make contact, on the inclined face 221, the coupling part 615 between a first side face portion 611 and a fourth side face portion 614 of the box member 600.

Likewise, when a box member smaller than the box member 500 is held, the second carriage 2 is brought closer to the first carriage 1 than when holding the box member 500. In this way, it is possible to hold a box member smaller than the box member 500.

Thus, in the linear transport apparatus 100 of this embodiment, changing the position of the second carriage 2 relative to the first carriage 1 permits box members of varying sizes to be held with no change in the shapes of the first and second claw portions 12 and 22.

<Processing Section>

A processing section will now be described, taking as an example a case where the box member 500 is transported. As shown in FIG. 1 etc., the linear transport apparatus 100 has three processing sections, namely the first, second, and third processing sections Sh1, Sh2, and Sh3, disposed near the transport region Ar1. In the linear transport apparatus 100 of this embodiment, the first processing section Sh1 handles the formation of the bottom portion 53 of the box member 500: the second processing section Sh2 handles the loading of the box member 500 with a packed article Bt in a circular columnar shape: the third processing section Sh3 handles the formation of the lid portion 52 of the box member 500. The packed article Bt here is an article in the form of a bottle with liquid contents.

Figure 12:
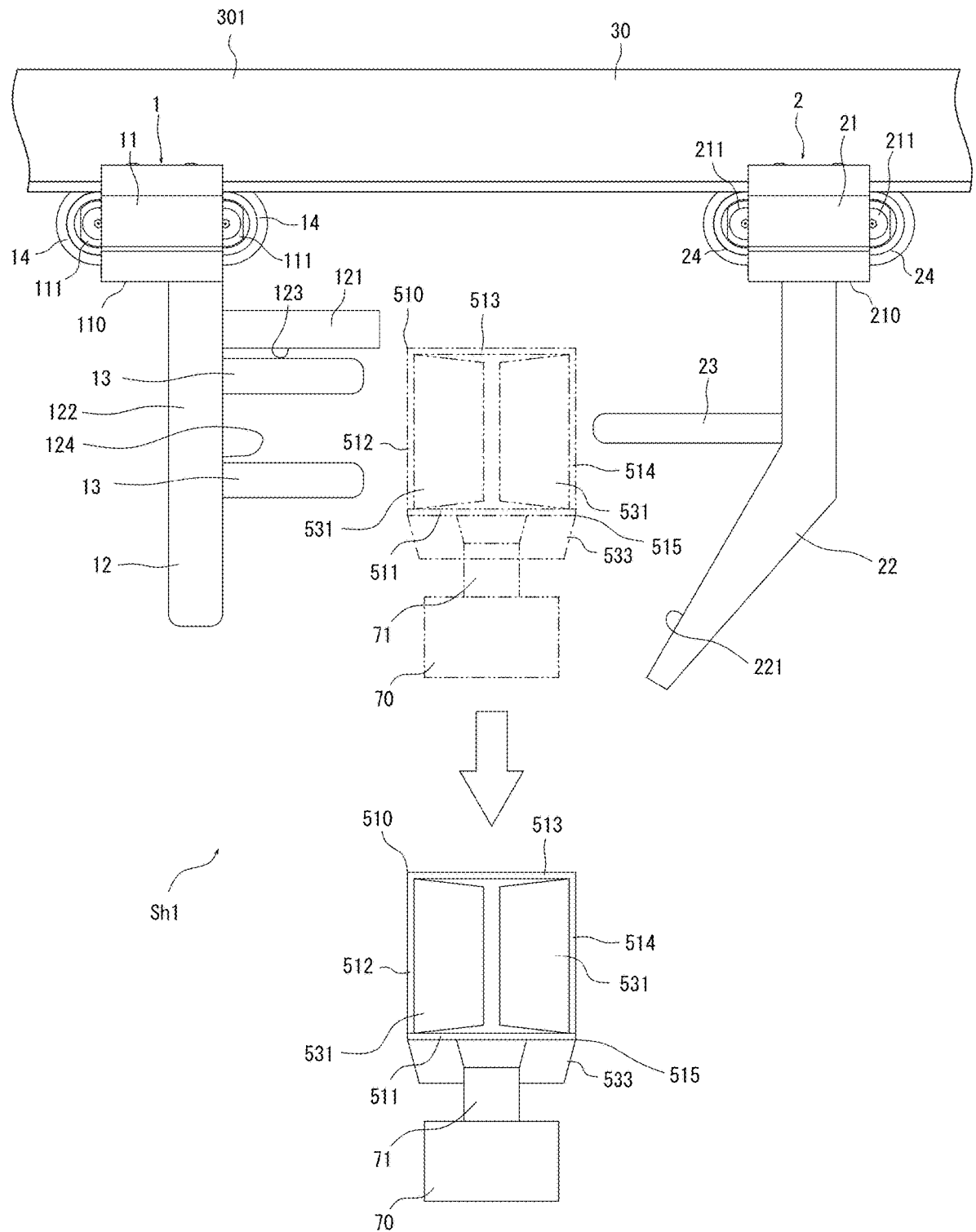
FIG. 12 is a plan view of a first processing section along the transport direction.
Figure 13:
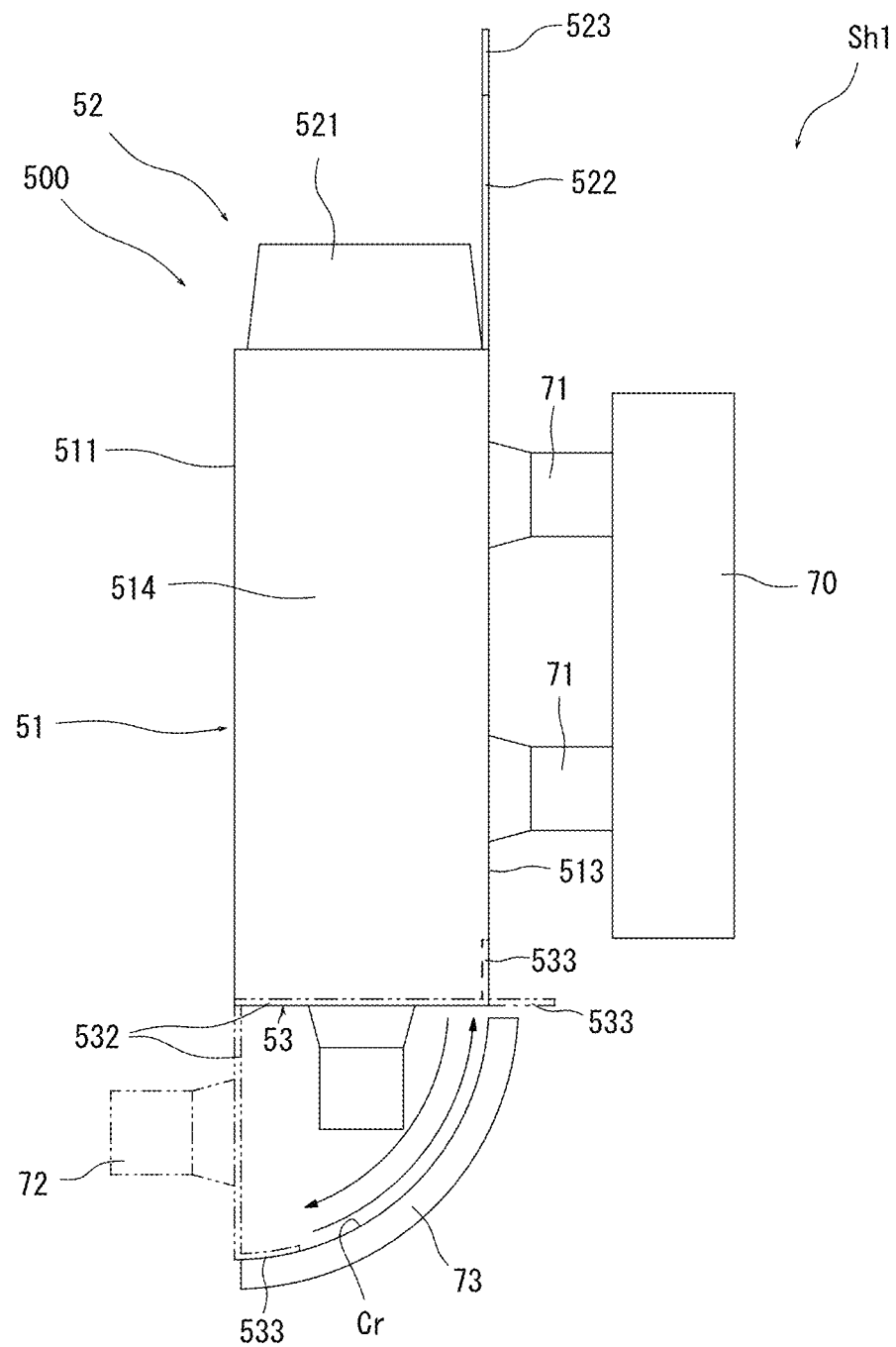
FIG. 13 is a diagram showing the first processing section as seen from behind along the transport direction.

The first processing section Sh1 will now be described with reference to the relevant drawings. FIG. 12 is a plan view of the first processing section Sh1 along the transport direction Tr. FIG. 13 is a diagram showing the first processing section Sh1 as seen from behind along the transport direction Tr.

As shown in FIG. 1, the first processing section Sh1 is disposed near the first straight portion 301. As shown in FIGS. 12 and 13, the first processing section Sh1 has a frame 70, holding suction cups 71, a closing suction cup 72, a folding guide 73, and an actuator 74. The first processing section Sh1 is connected to the control unit 43 in the linear driving unit 4 (see FIG. 6). The actuator 74 for driving different parts of the first processing section Sh1 operates based on instructions from the control unit 43. That is, the control unit 43 doubles as a control unit that controls the operation of the first processing section Sh1.

As shown in FIG. 12, on the frame 70, the holding suction cups 71 and the closing suction cup 72 are disposed. In the first processing section Sh1, the actuator 74 permits the frame 70 to move away from the guide rail 30. The holding suction cups 71 are disposed one above the other. The holding suction cups 71 suck onto the first side face portion 511 of the box member 500. Thus, the holding suction cups 71 can hold the box member 500. With the holding suction cups 71 holding the box member 500, the frame 70 is moved away from the guide rail 30.

The closing suction cup 72 is disposed on the frame 70, below the holding suction cups 71. The closing suction cup 72 suck onto the preliminarily folded bottom lid portion 532. The closing suction cup 72 move so as to open and close the bottom lid portion 532. More specifically, the holding suction cups 71 are movable along an arc Cr (see FIG. 13) about a center axis parallel to the transport direction Tr.

The folding guide 73 is disposed below the frame 70. The folding guide 73 can, when the closing suction cup 72 holding the bottom lid portion 532 moves along the arc Cr, fold the bottom insertion flap portion 533 formed at the free end of the bottom lid portion 532. With the bottom insertion flap portion 533 folded, the closing suction cup 72 is moved along the arc Cr back to its original position. Meanwhile, the bottom insertion flap portion 533 slides on the inner face of the folding guide 73 and is fitted in the gap between the inner bottom plates 531 and the first side face portion 511 in a bottom end part of the tubular portion 51. That is, the folding guide 73 folds the bottom insertion flap portion 533 and guides the bottom insertion flap portion 533 to an appropriate fitting position on the box member 500. Thus, the bottom portion 53 is formed.

The actuator 74 has, for example, a motor, a cylinder, or the like. The actuator 74 operates based on instructions from the control unit 43. The actuator 74 may be provided with a driving circuit that drives the actuator 74. The driving circuit can be configured to include a power supply circuit that supplies the actuator 74 with electric power.

In the linear transport apparatus 100, the first processing section Sh1 receives the box member 500 from the first and second carriages 1 and 2. More specifically, when the box member 500 held by the first and second carriages 1 and 2 is transported to a position where the first processing section Sh1 can process it, the control unit 43 controls the linear driving unit 4 so as to stop the first and second carriages 1 and 2.

When the first and second carriages 1 and 2 stop, the box member 500 too stops. That is, the transport of the box member 500 is suspended. In this state, the control unit 43 controls the actuator 74 so as to move the frame 70 to bring the suction surfaces of the two holding suction cups 71 into contact with the first side face portion 511 of the box member 500. The control unit 43 then makes the holding suction cups 71 suck onto the first side face portion 511. Then either the first carriage 1 is moved rearward along the transport direction Tr or the second carriage 2 is moved frontward along the transport direction Tr. In this way, the box member 500 is switched from holding by the first and second carriages 1 and 2 to holding by the holding suction cups 71.

The control unit 43 then operates the actuator 74 to move the frame 70. Thus, the box member 500 is moved to a position away from the first and second carriages 1 and 2. After that, the operation described above is performed to complete the bottom portion 53 of the box member 500.

After the bottom portion 53 is completed, the control unit 43 operates the actuator 74 to operate the frame 70. Thus, the box member 500 is disposed between the first and second carriages 1 and 2 along the transport direction Tr. The control unit 43 further operates the linear driving unit 4 to hold the box member 500 with the first and second carriages 1 and 2. After that, the holding of the box member 500 with the holding suction cups 71 is ended. The frame 70 is them moved to move the first and second carriages 1 and 2 along the transport direction Tr to restart the transport of the box member 500.

Thus, in the linear transport apparatus 100, the first processing section Sh1 suspends the transport of the box member 500, moves the box member 500 away from the transport region Ar1, and then completes the formation of the bottom portion 53. It then hands over the box member 500 to the first and second carriages 1 and 2 and restarts its transport.

In the linear transport apparatus 100, the second and third processing sections Sh2 and Sh3 are disposed near the second straight portion 302.

Also in the second processing section Sh2, as in the first processing section Sh1, the transport of the box member 500 is suspended, and the box member 500 is loaded with the packed article Bt. After that, the box member 500 loaded with the packed article Bt is held with the first and second carriages 1 and 2 and its transport is restarted.

Likewise, in the third processing section Sh3, as in the first and second processing sections Sh1 and Sh2, the transport of the box member 500 is suspended, and the lid portion 52 of the box member 500 is formed. In the formation of the lid portion 52, the pair of inner lid plates 521 are each folded inward, then the upper insertion flap portion 523 is folded, and then the outer lid plate 522 is folded. Meanwhile, the upper insertion flap portion 523 is fitted in the gap between the pair of inner lid plates 521 and the third side face portion 513 in a top end part of the tubular portion 51. In this way, the lid portion 52 is formed. After that, sealing tape is applied to the lid portion 52 and the bottom portion 53, the box member 500 is held with the first and second carriages 1 and 2, and its transport is restarted.

The box member 500 held by the first and second carriages 1 and 2 is then transported further to be carried out at the carry-out section OutA.

As described above, using the linear transport apparatus 100 to move the box member 500 permits the box member 500 in the middle of transport to be stopped to be subjected to desired processing. In this way, it is possible to perform, as processing that needs to be performed during transport, processing that requires precise operation such as formation of the bottom portion 53 and the lid portion 52.

In the linear transport apparatus 100, a plurality of kinds of processing can be disposed in a fashion distributed along the transport region, and this helps reduce the structure of each processing section corresponding to given processing. Thus, as compared with a design with a sole processing section that performs a plurality of kinds of processing, it is possible to simplify the linear transport apparatus 100 and reduce its footprint area. Moreover, distributed processing helps reduce the processing wait times and hence the total processing time.

First Modified Example

Figure 14:
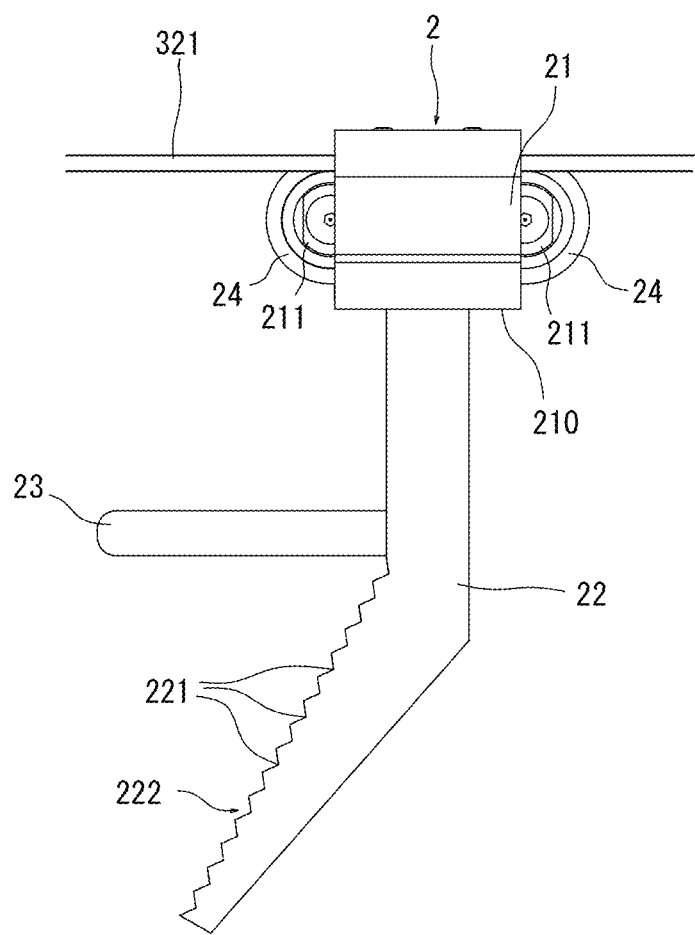
FIG. 14 is an enlarged plan view of an inclined face in another example of the second carriage.

In this embodiment, the inclined face 221 of the second claw portion 22 of the second carriage 2 is formed as a flat surface in the shape of straight line as seen in a plan view; with no limitation intended. It may instead be, for example, in a concave shape concave at the middle or in a convex shape convex at the middle. Or, as shown in FIG. 14, the inclined face 221 may be in the shape of a plurality of V-shaped grooves 222 running side by side. With such structures, the coupling portion 515 between the first and fourth side face portions 511 and 514 can be engaged with a V-shaped groove 222. The box member 500 can then be held more securely.

Second Modified Example

Figure 15:
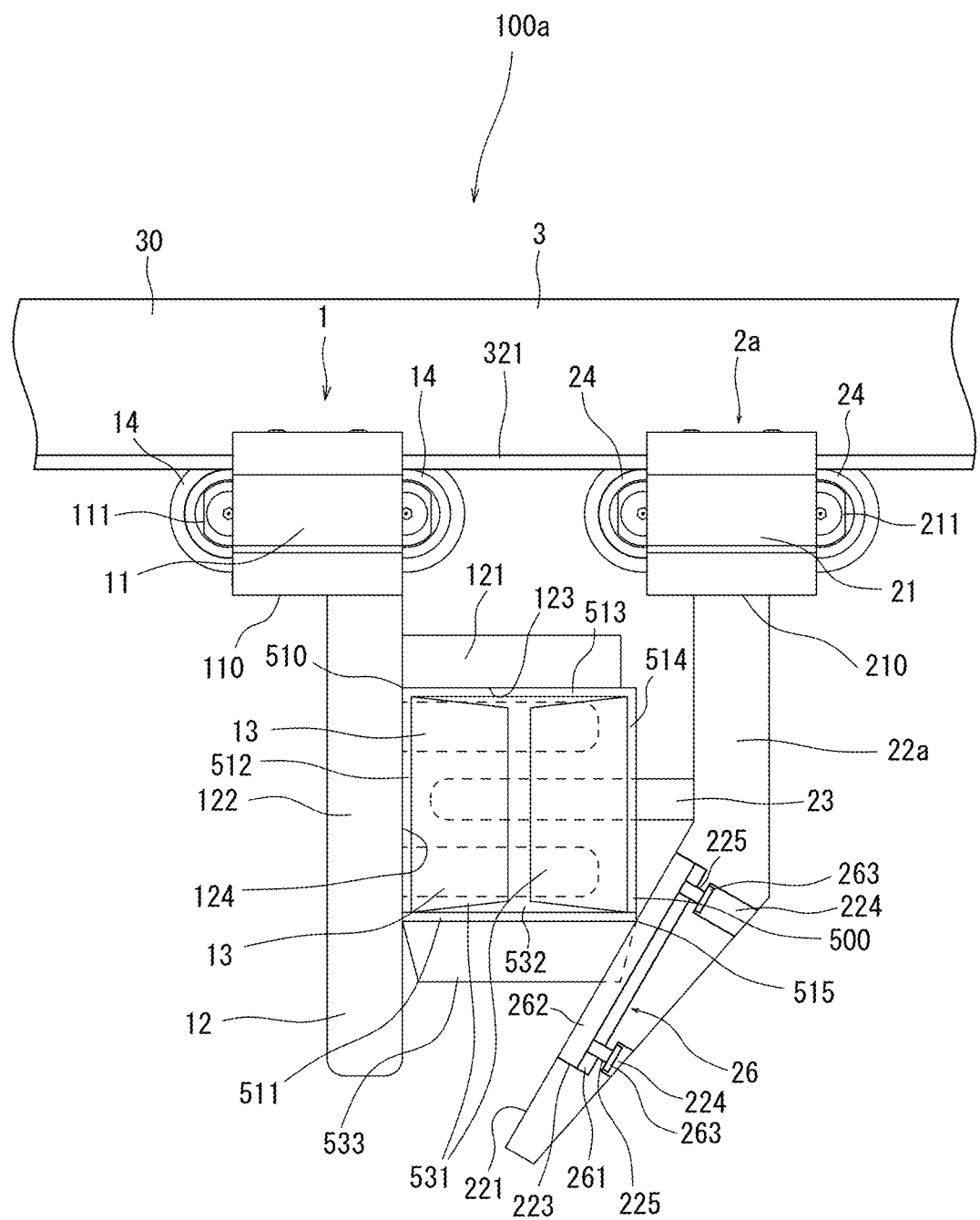
FIG. 15 is a plan view of a linear transport apparatus of a second modified example.
Figure 16:
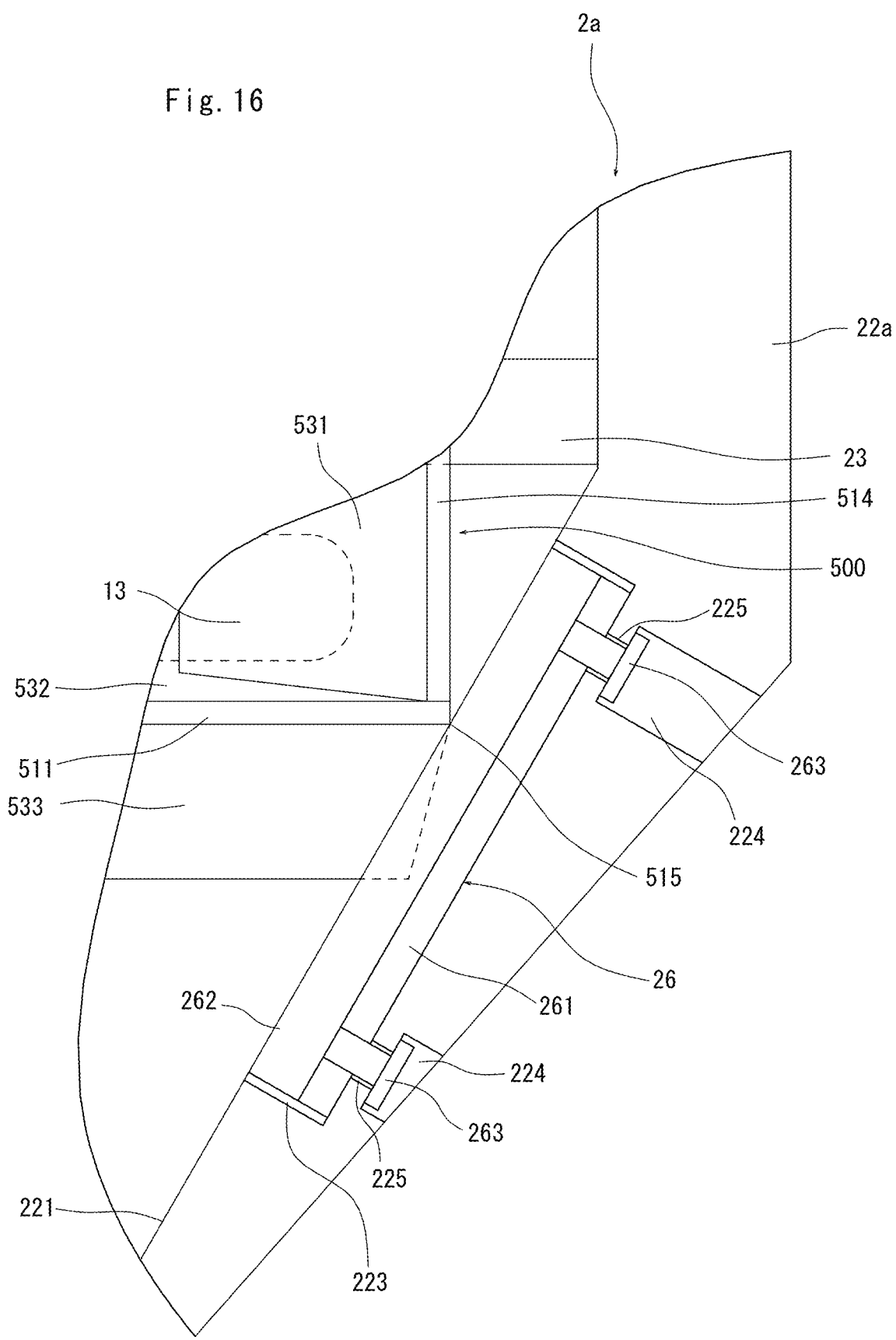
FIG. 16 is an enlarged plan view of a second claw portion of a second carriage in the linear transport apparatus of the second modified example.

Yet another modified example of this embodiment will be described with reference to the relevant drawings. FIG. 15 is a plan view of a linear transport apparatus 100a of a second modified example. FIG. 16 is an enlarged plan view of a second claw portion 22a of a second carriage 2a of the linear transport apparatus 100a of a second modified example. The second carriage 2a of the linear transport apparatus 100a of the second modified example has a contact portion 26 on the second claw portion 22a, in which respect it differs from the second claw portion 22 of the linear transport apparatus 100 shown in FIG. 2 etc. In the other respects, the linear transport apparatus 100a has the same structure as the linear transport apparatus 100. Accordingly, such parts of the linear transport apparatus 100a as find substantially the same parts in the linear transport apparatus 100 are identified by the same reference signs and no overlapping description will be repeated.

As shown in FIGS. 15 and 16, the linear transport apparatus 100a has a second carriage 2a. The second carriage 2a has a second claw portion 22a. The second claw portion 22a has a contact portion 26 disposed in an inclined face 221.

In the inclined face 221 of the second claw portion 22a, a recessed portion 223 extending up- and downward is formed. The recessed portion 223 is formed in a part that when the box member 500 is held, makes contact with the coupling portion 515 of the box member 500. As described previously, the second carriage 2a has a predetermined length on the inclined face 221 such that it can hold box members 500 of varying sizes.

The contact portion 26 is disposed in the recessed portion 223. In the face of the second claw portion 22a opposite from the recessed portion 223, a holding member insertion portion 224 is formed so as to penetrate to the recessed portion 223. As shown in FIGS. 15 and 16, in the holding member insertion portion 224, a holding member 263, described later, of the contact portion 26 is inserted. The holding member 263 put through the holding member insertion portion 224 holds the contact portion 26.

The contact portion 26 is so shaped and sized to be insertable in the recessed portion 223. The contact portion 26 has a base member 261, a damping member 262, and a holding member 263. The base member 261 is in the shape of a substantially rectangular plate. The base member 261 is formed of, for example, the same material as the second claw portion 22a. So long as the base member 261 is sufficiently rigid to hold the contact portion 26 securely, it may be formed of a material different from that of the second claw portion 22a.

The damping member 262 is fixed to the base member 261. The damping member 262 is configured to be fixed to the base member 261, and is, as seen from the thickness direction of the base member 261, in a rectangular shape congruent with the base member 261. To one face of the base member 261, the holding member 263 is fixed. To the face of the base member 261 opposite from its face to which the holding member 263 is fixed, the damping member 262 is fixed. The fixing of the damping member 262 can be achieved by bonding, welding, fitting-in, or the like, with no limitation intended. For example, the damping member 262 may be fixed to the base member 261 via the holding member 263.

Thus, when the first and second claw portions 12 and 22a hold the box member 500 between them, the coupling portion 515 of the box member 500, with which the latter makes contact, makes contact with the damping member 262 in the contact portion 26. The damping member 262 is formed of a flexible material such as urethane or silicone rubber. More specifically, the damping member 262 has lower mechanical strength than the box member 500 held by the first and second claw portions 12 and 22a. Thus, when the first and second claw portions 12 and 22a hold the box member 500, the damping member 262 deforms. This suppresses deformation of the box member 500 (the coupling portion 515 in particular).

As described above, the holding member 263 is inserted in the holding member insertion portion 224. The part of the holding member 263 that has penetrated through the holding member insertion portion 224 to reach the recessed portion 223 is fastened to the base member 261 of the contact portion 26. With the holding member 263 fastened to the base member 261, the contact portion 26 disposed in the recessed portion 223 is held on the second claw portion 22a. The holding member 263 can be, for example, a screw. In that case, the base member 261 has an internal thread with which the holding member 263 meshes.

Using a screw as the holding member 263 as described above permits removable fitting of the contact portion 26. Thus, when the damping member 262 deteriorates, the contact portion 26 can be replaced easily. It can be replaced with a contact portion 26 that has a damping member 262 with an optimal mechanical strength in comparison with that of the box member 500. The holding member 263 is not limited to a screw. The holding member 263 may be, for example, of any kind such as a rivet. The holding member may be adhesive, sticky tape, or the like. As the holder 263, any method that allows secure fastening inside the recessed portion 223 can be employed.

The above-described structure of the contact portion 26 is merely one example and is not meant as any limitation. For example, the damping member may be fixed directly to the inclined face 221. Any design of a contact portion disposed to permit the coupling portion 515 of the box member 500 to make contact with a damping member and any method of fitting the contact portion to the second claw portion 22 can be employed. A part of the second claw portion including the inclined face 221 may be formed of a flexible material. In that case, the entire second claw portion may be formed of a flexible material.

While the linear transport apparatus 100 of this embodiment includes, as processing sections, the first processing section Sh1 that forms the bottom portion 53 of the box member 500, the second processing section Sh2 that loads the packed article Bt, and the third processing section Sh3 that forms the lid portion 52, this is not meant as any limitation. Any other kind of processing may be employed such as holding the box member 500 with a robot arm and rotating it about a rotation axis extending along the top-bottom direction, printing a manufacturing date or the like on a box member, checking the exterior appearance of the box member 500, and putting a seal. Any of yet other processes that can be performed on a transported article may be employed.

While the linear transport apparatus 100 of this embodiment is configured to hold a box member 500 substantially in the shape of a square as seen in a plan view, this is not meant as any limitation. For example, the box member may be one substantially in the shape of a rectangle as seen in a plan view. Any shape can be employed that can be held by pressing inward, with respect to the transport direction, a rear and an inner part of it and a front and an outer part of it.

While embodiments of the present invention have been described above, they are not meant to limit the scope of the invention. Embodiments of the present invention allow for many modifications without departure from the spirit of the invention.

REFERENCE SIGNS LIST 100 linear transport apparatus
1 first carriage
11 body portion
111 upper roller support portion
112 lower roller support portion
12 first claw portion
121 inner contact portion
122 rear contact portion
123 first contact face
124 second contact face
13 first support portion
14 upper roller
141 roller ridge
15 lower roller
2 second carriage
21 body portion
211 upper roller support portion
212 lower roller support portion
22 second claw portion
221 inclined face
222 groove
23 second support portion
24 upper roller
241 roller ridge
25 lower roller
2a second carriage
22a second claw portion
223 recessed portion
224 holding member insertion portion
26 contact portion
261 base member
262 damping member
263 holding member
3 guide portion
30 guide rail
301 first straight portion
302 second straight portion
31 main rail
32 grooved rail
321 rail portion
33 flat rail
30a guide rail
303 first curved portion
304 second curved portion
4 linear driving unit
41 coil
42 magnet
43 control unit
431 processing circuit
432 storage circuit
44 linear motor driver
70 frame
71 holding suction cup
72 closing suction cup
73 guide
74 actuator
500 box member
501 folded member
51 tubular portion
511 first side face portion
512 second side face portion
513 third side face portion
514 fourth side face portion
515 coupling portion
52 lid portion
521 inner lid plate
522 outer lid plate
523 upper insertion flap portion
53 bottom portion
531 inner bottom plate
532 bottom lid portion
533 bottom insertion flap portion
600 box member
611 first side face portion
612 second side face portion
613 third side face portion
614 fourth side face portion

The invention claimed is:

1. A linear transport apparatus that holds a box member in a rectangular shape as seen in a plan view and that transports the box member along a previously set transport direction, the apparatus comprising:
a guide portion formed in a shape of a loop as seen in a plan view;
a first carriage and a second carriage disposed on the guide portion next to each other along the transport direction and movable along the transport direction;
a linear driving unit that controls the first and second carriages independently; and
a support portion that supports a bottom portion of the box member, wherein
the second carriage is disposed frontward of the first carriage along the transport direction,
the first carriage has a first claw portion protruding away from the guide portion,
the second carriage has a second claw portion protruding away from the guide portion, the first claw portion has:
- an inner contact portion having a first contact face, the first contact face extending along the transport direction and making contact with an inner face of the box member along the transport direction; and
- a rear contact portion having a second contact face making contact with a rear face of the box member along the transport direction, the second claw portion has, in at least part of a rear face thereof along the transport direction, an inclined face that extends rearward along the transport direction as it goes away from the guide portion, the inclined face making contact with a coupling part between a front face of the box member along the transport direction and an outer face of the box member, and the support portion is disposed on at least one of the first and second carriages.

2. The linear transport apparatus according to claim 1, wherein the first carriage has a plurality of the first claw portions disposed above each other.

3. The linear transport apparatus according to claim 1, wherein the second carriage has a plurality of the second claw portions disposed above each other.

4. The linear transport apparatus according to claim 1, wherein the support portion has:
- a first support portion disposed on the first carriage and extending frontward along the transport direction; and
- a second support portion disposed on the second carriage and extending rearward along the transport direction, and
- wherein the first and second support portions are disposed at an interval from each other along a direction intersecting with the transport direction.

5. The linear transport apparatus according to claim 4, wherein the first support portion is fitted to the first claw portion and the second support portion is fitted to the second claw portion.

6. The linear transport apparatus according to claim 1, wherein in the inclined face of the second claw portion, a contact part that makes contact with a corner part of the box member is disposed, and
- wherein the contact part has lower mechanical strength than the box member.

7. The linear transport apparatus according to claim 1, wherein
- the box member is in a shape of a rectangular parallelepiped,
- the linear transport apparatus includes a processing section disposed near a transport region across which the box member is transported, the processing section performing a predetermined process on the box member, and
- in the predetermined process, the processing section forms a bottom portion of the box member.

8. The linear transport apparatus according to claim 7, wherein the processing section operates in coordination with the linear driving unit, and
- wherein the processing section receives the box member from the first and second carriages suspended by the linear driving unit, then performs the predetermined process, and then transfers the box member to the first and second carriages.

\* \* \* \* \*